(12) United States Patent
Santoro, Jr. et al.

(10) Patent No.: US 12,061,161 B2
(45) Date of Patent: Aug. 13, 2024

(54) OPERATION OF COMBUSTIBLE GAS SENSOR IN A DYNAMIC MODE WITH A CONSTANT RESISTANCE SETPOINT

(71) Applicant: MSA TECHNOLOGY, LLC, Cranberry Township, PA (US)

(72) Inventors: Daniel D. Santoro, Jr., Pittsburgh, PA (US); Meghan E. Swanson, Cranberry Township, PA (US); Michael Alvin Brown, Cranberry Township, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 0 days.

(21) Appl. No.: 18/205,207

(22) Filed: Jun. 2, 2023

(65) Prior Publication Data

US 2023/0349853 A1    Nov. 2, 2023

Related U.S. Application Data

(63) Continuation of application No. 16/711,413, filed on Dec. 11, 2019, now Pat. No. 11,703,473.

(51) Int. Cl.
*G01N 27/18* (2006.01)
*G01N 27/16* (2006.01)

(52) U.S. Cl.
CPC ............. *G01N 27/18* (2013.01); *G01N 27/16* (2013.01)

(58) Field of Classification Search
CPC .............................. G01N 27/18; G01N 27/16
See application file for complete search history.

(56) References Cited

U.S. PATENT DOCUMENTS

| 3,948,810 A | 4/1976 | Hervert |
| 4,097,353 A | 6/1978 | Kishida |
| 4,251,809 A | 2/1981 | Cheney |

(Continued)

FOREIGN PATENT DOCUMENTS

| EP | 0094863 | 11/1983 |
| EP | 0130785 | 3/1988 |

(Continued)

OTHER PUBLICATIONS

Mosely, P.T., Solid State Gas Sensors, Adams Hilger Press, Bristol, England, 18-31 (1987).

(Continued)

*Primary Examiner* — David J Bolduc
(74) *Attorney, Agent, or Firm* — BARTONY & ASSOCIATES LLC

(57) ABSTRACT

A gas sensor device includes a sensing element including a heating element and electronic circuitry in connection with the heating element. The sensing element forms a resistive element in a circuit of the electronic circuitry. The electronic circuity operates the sensing element in a trigger mode via a pulsed energy input to the heating element at a first duty cycle and in a primary mode via a pulsed energy input to the heating element at a second duty cycle, which is greater than the first duty cycle. The electronic circuitry is further configured to measure a response of the sensing element over time during each pulse of a plurality of pulses of the pulsed energy input. The primary mode is entered upon measurement of a value of a response at or above a threshold value in the trigger mode of operation.

20 Claims, 16 Drawing Sheets

(56) References Cited

U.S. PATENT DOCUMENTS

| | | | |
|---|---|---|---|
| 4,280,845 A | | 7/1981 | Matsushisa |
| 4,305,724 A | * | 12/1981 | Micko ................... G01N 27/16 73/23.31 |
| 4,532,797 A | * | 8/1985 | Yang ...................... G01N 27/18 73/75 |
| 4,533,520 A | | 8/1985 | Bossart |
| 4,569,826 A | | 2/1986 | Shiratori |
| 4,627,269 A | | 12/1986 | Forster |
| 4,950,628 A | | 8/1990 | Landon |
| 4,963,246 A | * | 10/1990 | Nakajima ............ G01N 27/417 204/406 |
| 5,234,837 A | | 8/1993 | Accorsi |
| 5,368,713 A | | 11/1994 | Friese |
| 5,401,470 A | | 3/1995 | Poli |
| 5,423,973 A | | 6/1995 | Friese |
| 5,494,701 A | | 2/1996 | Clough |
| 5,528,225 A | | 6/1996 | Sakai |
| 5,551,283 A | * | 9/1996 | Manaka ................... G01F 1/69 73/75 |
| 5,599,584 A | | 2/1997 | Champney, Jr. |
| 5,780,715 A | | 7/1998 | Imblum |
| 5,841,021 A | | 11/1998 | De Castro |
| 5,852,238 A | | 12/1998 | Vaitkus |
| 5,902,556 A | | 5/1999 | Van De Vyver |
| 6,019,946 A | | 2/2000 | Castillo |
| 6,071,476 A | | 6/2000 | Young |
| 6,080,219 A | | 6/2000 | Jha |
| 6,131,438 A | | 10/2000 | Zanini-Fisher |
| 6,344,174 B1 | * | 2/2002 | Miller ................... G01N 27/16 422/90 |
| 6,357,279 B1 | * | 3/2002 | Willis .................. G01N 27/185 73/25.03 |
| 6,548,024 B1 | | 4/2003 | Doncaster |
| 6,663,834 B1 | | 12/2003 | Miller |
| 6,705,152 B2 | | 3/2004 | Routkevitch |
| 6,756,016 B2 | | 6/2004 | Miller |
| 6,812,708 B2 | | 11/2004 | Bristol |
| 7,559,228 B2 | | 7/2009 | Baha |
| 7,833,482 B2 | | 11/2010 | Samari |
| 8,373,568 B2 | | 2/2013 | Moe |
| 8,826,721 B2 | | 11/2014 | Zanella, Sr. |
| 9,228,967 B2 | | 1/2016 | Alepee |
| 9,625,406 B2 | | 4/2017 | Zanella, Sr. |
| 2002/0118027 A1 | | 8/2002 | Routkevitch |
| 2002/0146352 A1 | | 10/2002 | Wang |
| 2004/0065140 A1 | * | 4/2004 | Bristol ................... G01N 27/16 73/25.05 |
| 2004/0113802 A1 | * | 6/2004 | Green ................... G08B 21/16 340/632 |
| 2004/0208789 A1 | | 10/2004 | Miller |
| 2005/0217370 A1 | | 10/2005 | Takahashi |
| 2006/0228261 A1 | | 10/2006 | Iwamoto |
| 2006/0266103 A1 | * | 11/2006 | Bahs ...................... G01N 27/16 73/25.01 |
| 2007/0199186 A1 | | 8/2007 | Yoshino |
| 2008/0034841 A1 | | 2/2008 | Bahs |
| 2008/0111868 A1 | | 5/2008 | Yamane |
| 2008/0156076 A1 | * | 7/2008 | Samari ................... G01N 27/16 73/31.05 |
| 2008/0226505 A1 | * | 9/2008 | Willettt ................. G01N 27/16 73/23.21 |
| 2009/0133472 A1 | | 5/2009 | Tada |
| 2009/0324449 A1 | * | 12/2009 | Kira ....................... G01N 27/16 422/96 |
| 2010/0018181 A1 | | 1/2010 | Popovic |
| 2011/0100090 A1 | | 5/2011 | Zanella, Sr. |
| 2011/0223364 A1 | | 9/2011 | Hawkins |
| 2012/0318037 A1 | | 12/2012 | Lee |
| 2013/0236199 A1 | | 9/2013 | Yamamoto |
| 2014/0273263 A1 | | 9/2014 | Zanella, Sr. |
| 2014/0348709 A1 | | 11/2014 | Zanella, Sr. |
| 2015/0212030 A1 | * | 7/2015 | Alepee ................... G01N 27/18 422/94 |
| 2017/0024992 A1 | | 1/2017 | Chey |
| 2017/0341223 A1 | | 11/2017 | Hahakura |
| 2018/0128763 A1 | * | 5/2018 | Swanson ................ G01N 31/12 |
| 2018/0335411 A1 | | 11/2018 | Zanella, Sr. |
| 2018/0335412 A1 | | 11/2018 | Zanella, Sr. |
| 2019/0212288 A1 | * | 7/2019 | Swanson ................ G01N 31/12 |
| 2020/0025701 A1 | * | 1/2020 | Brown ................... G01N 27/16 |
| 2020/0393432 A1 | * | 12/2020 | Swanson ............ G01N 33/0013 |

FOREIGN PATENT DOCUMENTS

| | | |
|---|---|---|
| EP | 0311964 | 4/1989 |
| EP | 0313390 | 4/1989 |
| EP | 0364982 A2 | 4/1990 |
| EP | 0703449 | 3/1996 |
| EP | 0500598 B1 | 3/1997 |
| EP | 1505385 A1 | 2/2005 |
| GB | 1550615 A | 8/1979 |
| GB | 2067294 | 7/1981 |
| GB | 2121180 | 12/1983 |
| JP | H08247984 | 9/1996 |
| JP | 2000039413 A | 2/2000 |
| JP | 2008096267 | 4/2008 |
| WO | WO2000043765 A1 | 7/2000 |
| WO | WO2006111727 A1 | 10/2006 |
| WO | WO2011053866 A1 | 5/2011 |
| WO | WO2018085026 | 5/2018 |
| WO | WO2018212965 | 11/2018 |
| WO | WO2018212966 | 11/2018 |
| WO | WO2020018526 | 1/2020 |
| WO | WO2021118776 A1 | 6/2021 |

OTHER PUBLICATIONS

Firth, J.G. et al., The Principles of the Detection of Flammable Atmospheres by Catalytic Devices, Combustion and Flame 21, 303-311 (1973).

Cullis, C.F., Eds., Detection and Measurement of Hazardous Gases, Heinemann, Exeter, 29-67 (1981).

Accorsi, Antoinette et al., Improving catalytic sensors performances by electronic techniques, Eurosensors VI, Oct. 7, 1992, Spain, 1-27.

* cited by examiner

OPERATION OF COMBUSTIBLE GAS SENSOR IN A DYNAMIC MODE WITH A CONSTANT RESISTANCE SETPOINT

CROSS-REFERENCE TO RELATED APPLICATIONS

This application is a continuation application of U.S. patent application Ser. No. 16/711,413, filed Dec. 11, 2019, the disclosure of which is incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Catalytic or combustible (flammable) gas sensors have been in use for many years to, for example, prevent accidents caused by the explosion of combustible or flammable gases. In general, combustible gas sensors operate by catalytic oxidation of combustible gases.

The operation of a catalytic combustible gas sensor proceeds through electrical detection of the heat of reaction of a combustible gas on the oxidation catalysts, usually through a resistance change. The oxidation catalysts typically operate in a temperature above 100° C. (and, more typically, above 300° C.) to catalyze combustion of an analyte (for example, in the range of 350 to 600° C. temperature range for methane detection). Therefore, the sensor must sufficiently heat the sensing element through resistive heating. In a number of combustible gas sensors, the heating and detecting element are one and the same and composed of a platinum alloy because of its large temperature coefficient of resistance and associated large signal in target/analyte gas. The heating element may be a helical coil of fine wire or a planar meander formed into a hotplate or other similar physical form. The catalyst being heated often is an active metal catalyst dispersed upon a refractory catalyst substrate or support structure. Usually, the active metal is one or more noble metals such as palladium, platinum, rhodium, silver, and the like and the support structure is a refractory metal oxide including, for example, one or more oxides of aluminum, zirconium, titanium, silicon, cerium, tin, lanthanum and the like. The support structure may or may not have high surface area (that is, greater than 75 m$^2$/g). Precursors for the support structure and the catalytic metal may, for example, be adhered to the heating element in one step or separate steps using, for example, thick film or ceramic slurry techniques. A catalytic metal salt precursor may, for example, be heated to decompose it to the desired dispersed active metal, metal alloy, and/or metal oxide.

As illustrated in FIGS. 1A and 1B, a number of conventional combustible gas sensors such as illustrated sensor 10 typically include an element such as a platinum heating element wire or coil 20 encased in a refractory (for example, alumina) bead 30, which is impregnated with a catalyst (for example, palladium or platinum) to form an active or sensing element, which is sometimes referred to as a pelement 40, pellistor, detector or sensing element. A detailed discussion of pelements and catalytic combustible gas sensors which include such pelements is found in Mosely, P. T. and Tofteld, B. C., ed., *Solid State Gas Sensors*, Adams Hilger Press, Bristol, England (1987). Combustible gas sensors are also discussed generally in Firth, J. G. et al.; *Combustion and Flame* 21, 303 (1973) and in Cullis, C. F., and Firth, J. G., Eds., *Detection and Measurement of Hazardous Gases*. Heinemann, Exeter, 29 (1981).

Bead 30 will react to phenomena other than catalytic oxidation that can change its output (i.e., anything that changes the energy balance on the bead) and thereby create errors in the measurement of combustible gas concentration. Among these phenomena are changes in ambient temperature, humidity, and pressure.

To minimize the impact of secondary effects on sensor output, the rate of oxidation of the combustible gas may, for example, be measured in terms of the variation in resistance of sensing element or pelement 40 relative to a reference resistance embodied in an inactive, compensating element or pelement 50. The two resistances may, for example, be part of a measurement circuit such as a Wheatstone bridge circuit as illustrated in FIG. 1C. The output or the voltage developed across the bridge circuit when a combustible gas is present provides a measure of the concentration of the combustible gas. The characteristics of compensating pelement 50 are typically matched as closely as possible with active or sensing pelement 40. In a number of systems, compensating pelement 50 may, however, either carry no catalyst or carry an inactivated or poisoned catalyst. In general, changes in properties of compensating elements caused by changing ambient conditions are used to adjust or compensate for similar changes in the sensing element.

Active or sensing pelement 40 and compensating pelement 50 can, for example, be deployed within wells 60a and 60b of an explosion-proof housing 70 and can be separated from the surrounding environment by a flashback arrestor, for example, a porous metal frit 80. Porous metal frit 80 allows ambient gases to pass into housing 70 but prevents ignition of flammable gas in the surrounding environment by the hot elements. Such catalytic gas sensors are usually mounted in instruments which, in some cases, must be portable or wireless and, therefore, carry their own power supply. It is, therefore, desirable to minimize the power consumption of a catalytic gas sensor.

Oxidation catalysts formed onto a helical wire heater are typically referred to as pelements, while those formed onto hotplates (whether microelectronic mechanical systems (MEMS) hotplates or conventional, larger hotplates) are sometimes known by the substrate. Oxidative catalysts formed on MEMS heating elements are sometimes referred to herein as MEMS pellistors. As described above, the detecting pelements or catalytically active hotplates can be paired with a similarly sized heater coated with materials with similar thermal conductivity as the active catalyst but without active sites. The inactive pelement or hotplate may be used to compensate for changes in ambient temperature, relative humidity, or background thermal conductivity not associated with a combustible gas and are therefore often referred to as compensators. The matched pair of detecting and compensating elements can be assembled in a Wheatstone bridge configuration for operation and combustible gas detection, which requires that both the detector and compensator operate at the same elevated temperature. The high-temperature operation of the catalytic sensing element requires a significant amount of power consumption. Power consumption is particularly a problem in the case of detecting combustible gases as detection should be performed very often or continuously to ensure a safe environment. Portable instrument and wireless installations rely on battery systems for power.

In a number of currently available combustible gas sensors which include sensing and compensating beads, a third bead, sometimes referred to as a trigger or a "sniff(er) bead", is included which requires very little power. In a number of such sensors, the trigger bead is not required to provide a linear response and is not required to be immune to positive excursion temperature/humidity fluctuations. With the restrictions of linearity and immunity to positive temperature and humidity fluctuations eliminated, the size and power restrictions of the "trigger" bead may be reduced in comparison to detector beads.

Previous embodiments of combustible sensors have used a steady state constant voltage Wheatstone bridge or simulated Wheatstone bridge to achieve combustible gas detection. Further, a trigger element has been operated in a pulsed mode with a constant voltage setpoint control methodology to reduce overall power consumption of a sensor. Pulsed method may, for example, use simulated Wheatstone bridges with elements that have small thermal time constants and are thus able to respond to analyte gas in a short (for example, less than 500 ms) amount of time. Such methodologies allow for duty cycled operation (for example, less than 10% sensor on-time), thus reducing power consumption. The information from these elements is analyzed by supporting circuitry. If the presence of combustible analyte is determined via a trigger element, a more accurate and higher power sensing element is enabled or activated. This methodology provides combination of a low-power triggered operation with accurate and linear signal from the primary combustible sensing element.

SUMMARY

In one aspect, a method of operating a sensing element including a heating element in operative connection with electronic circuitry, wherein the sensing element forms a resistive element in a circuit of the electronic circuitry, includes, in at least a first phase, activating the electronic circuitry to heat the sensing element to a temperature at which the sensing element is responsive to an analyte gas via energy input to the heating element in a pulsed manner. A constant resistance setpoint is set for the sensing element and energy (for example, voltage, current or a combination thereof) through the circuit is variably controlled via the pulsed energy input toward achieving the constant resistance setpoint. The method further includes measuring a response of the sensing element over time to the pulsed energy input.

In a number of embodiments, the sensing element is operated in at least one of a mode in which the analyte gas is detected via a change in thermal conductivity from the response of the sensing element over time to the pulsed energy input and in a mode in which the analyte gas is detected via a combustion reaction of the analyte gas from the response of the sensing element over time to the pulsed energy input. The sensing element may, for example, include a catalyst supported thereon for catalytic combustion of the analyte gas. In a number of embodiments, the sensing element is operated in the mode in which the analyte gas is detected via a change in thermal conductivity from the response of the sensing element over time to the pulsed energy input in a lower temperature range and in the mode in which analyte gas is detected via a combustion reaction of the analyte gas from the response of the sensing element over time to the pulsed energy input in a higher temperature range.

In a number of embodiments, the circuit of the electronic circuitry including the heating element is controlled as Wheatstone bridge circuit or a simulated Wheatstone bridge circuit toward achieving the constant resistance setpoint. The method may, for example, include applying energy to the circuit before the at least the first phase for a period of time to unbalance the circuit. Energy may, for example, be applied to the circuit at a predetermined constant voltage for a predetermined time before the at least the first phase to unbalance the circuit.

In a number of embodiments, the method further includes limiting voltage, current or a combination thereof applied to the sensing element or supporting circuitry during the at least the first phase if a measured voltage, current or a combination thereof on the electronic circuitry is equal to or greater than a predetermined threshold value. Voltage across the sensing element may, for example, be measured as compared to a reference voltage.

In a number of embodiments, upon determining via the electronic circuitry that the measured voltage, current or the combination thereof would be less than the predetermined threshold value if current through the electronic circuitry were to be variably controlled via the pulsed energy input toward achieving the constant resistance setpoint, the method further includes beginning a second phase in which energy is input to the heating element in a pulsed manner and current through the electronic circuitry is variably controlled via the pulsed energy input toward achieving the constant resistance setpoint and the response of the sensor element over time to the pulsed energy input is measured.

In a number of embodiments, the method may further include measuring an amount of time that, voltage, current or as combination thereof is limited. The amount of time may be related to or used to determine a concentration of the analyte gas in the environment.

The sensing element may, for example, be a low-thermal-mass element which is operated as a trigger element of a trigger sensor for a primary combustible gas sensor in a trigger mode of operation via energy input to the heating element in the pulsed manner at a first duty cycle. In a number of embodiments, the sensing element includes a catalyst and, upon measuring a value of a response at or above a threshold value, the sensing element is operated as the primary combustible gas sensor element at a second duty cycle higher than the first duty cycle.

In another aspect, a gas sensor includes a sensing element including a heating element and electronic circuitry M operative connection with the heating element, wherein the sensing element forms a resistive element in the electronic circuitry. The electronic circuity is configured to operate the sensing element in at least a first phase in which the sensing element is heated to a temperature at which the sensing element is responsive to an analyte gas via energy input to the heating element in a pulsed manner. A constant resistance setpoint is set for the sensing element and energy (for example, voltage, current or a combination thereof) through the electronic circuity is variably controlled via the pulsed energy input toward achieving the constant resistance setpoint. The electronic circuitry is further configured to measure a response of the sensor element over time to the pulsed energy input. The electronic circuitry may, for example, be configured to operate the sensing element in a least one of a mode in which the analyte gas is detected via a change in thermal conductivity from the response of the sensor element over time to the pulsed energy input and a mode in which the analyte gas is detected via a combustion reaction of the sensor element over time to the pulsed energy input. The sensing element may, for example, include a catalyst supported thereon for catalytic combustion of the analyte gas. The gas sensor may be otherwise characterized as described herein.

In another aspect, a sensor system includes electronic circuitry including a control system and a primary combustible gas sensor including a first primary element in operative connection with the electronic circuitry. The primary combustible gas sensor includes a first primary support structure, a first primary catalyst supported on the first primary support structure and a first primary beating element in operative connection with the first primary support structure. The primary combustible gas sensor further includes a second primary element in operative connection with the electronic circuitry and including a second primary support structure, a second primary catalyst supported on the second primary support structure and a second primary heating element in operative connection with the second primary support structure. The sensor system further includes a trigger sensor including a first trigger element of low-thermal-mass including a first trigger heating element. The first trigger element is in operative connection with the electronic circuitry and forms a resistive element in the electronic circuitry. The electronic circuitry is configured to operate the trigger sensor to detect a value of a response at or above a threshold value. The primary combustible gas sensor is activated from a low-power state upon the threshold value being detected by the trigger sensor. The electronic circuitry is further configured to heat the first trigger element to a temperature at which the first trigger element is responsive to an analyte gas via energy input to the first trigger heating element in a pulsed manner. A constant resistance setpoint is set for the first trigger heating element and energy (for example, voltage, current or a combination thereof) through the electronic circuitry is variably controlled via the pulsed energy input toward achieving the constant resistance setpoint. The electronic circuitry is further configured to measure a response of the first trigger element over time to the pulsed energy input.

In a number of embodiments, the electronic circuitry is configured to operate the first trigger element in at least one of a mode in which the analyte gas is detected via a change in thermal conductivity from the response of the first trigger element over time to the pulsed energy input and in a mode in which the analyte gas is detected via a combustion reaction of the analyte gas from the response of the first trigger element over time to the pulsed energy input. In a number of embodiments, the first trigger element includes a catalyst supported thereon for catalytic combustion of the analyte gas. The primary combustible gas sensor and the trigger sensor may be further characterized as described herein.

In another aspect, a gas sensor includes a sensing element including a heating element and electronic circuitry in operative connection with the heating element, wherein the sensing element forms a resistive element in the electronic circuitry. The electronic circuitry is configured to operate the sensing element in a trigger mode of operation via energy input to the heating element in a pulsed manner at a first duty cycle and in a primary mode of operation via energy input to the heating element in a pulsed manner at a second duty cycle. The second duty cycle is greater than the first duty cycle. The electronic circuitry is further configured to measure a response of the sensing element over time to pulsed energy input. The primary mode of operation is entered upon measurement a value of a response at or above a threshold value in the trigger mode of operation. In a number of embodiments, a constant resistance setpoint is set for the sensing element and energy (for example, voltage, current or a combination thereof) through the electronic circuitry is variably controlled via the pulsed energy input toward achieving the constant resistance setpoint in at least the trigger mode of operation. Alternatively, a constant voltage setpoint maybe be set and energy (for example, voltage, current or a combination thereof) through the electronic circuitry is variably controlled via the pulsed energy input toward achieving the constant voltage setpoint.

In another aspect, a method of operating a sensing element including a heating element and electronic circuitry in operative connection with the heating element, wherein the sensing element forms a resistive element in the electronic circuitry, includes operating the sensing element in a trigger mode of operation via energy input to the heating element in a pulsed manner at a first duty cycle, measuring a response of the sensing element over time to the pulsed energy input in the trigger mode of operation, and, upon measurement a value of a response at or above a threshold value in the trigger mode of operation, entering a primary mode of operation via energy input to the heating element in a pulsed manner at a second duty cycle, wherein the second duty cycle is greater than the first duty cycle. In a number of embodiments, a constant resistance setpoint is set for the sensing element and energy (for example, voltage, current or a combination thereof) through the electronic circuitry is variably controlled via the pulsed energy input toward achieving the constant resistance setpoint in at least the trigger mode of operation. Alternatively, a constant voltage setpoint maybe be set and energy (for example, voltage, current or a combination thereof) through the electronic circuity is variably controlled via the pulsed energy input toward achieving the constant voltage setpoint.

In a further aspect, a gas sensor includes a sensing element including a heating element in operative connection with electronic circuitry, wherein the sensing element forms a resistive element in the electronic circuitry. The electronic circuitry is configured to operate the sensing element in at least a first phase by activating the electronic circuitry to heat the sensing element to a temperature at which the sensing element is responsive to an analyte gas via energy input to the heating element in a pulsed manner and to measure a response of the sensing element over time to the pulsed energy input. The electronic circuitry is configured to operate the sensing element in a mode in which the analyte gas is detected via a change in thermal conductivity from the response of the sensing element over time to the pulsed energy input in a lower temperature range and in a mode in which analyte gas is detected via a combustion reaction of the analyte gas from the response of the sensing element over time to the pulsed energy input in a higher temperature range. In a number of embodiments, a constant resistance setpoint is set for the sensing element and energy (for example, voltage, current or a combination thereof) through the electronic circuitry is variably controlled via the pulsed energy input toward achieving the constant resistance setpoint in at least the trigger mode of operation. Alternatively, a constant voltage setpoint maybe be set and energy (for example, voltage, current or a combination thereof) through the electronic circuity is variably controlled via the pulsed energy input toward achieving the constant voltage setpoint. Indeed, such modes of operation may be brought into effect over any heating/cooling cycle of a sensing element.

In still a further aspect, a method of operating a sensing element including a heating element in operative connection with electronic circuitry, wherein the sensing element forming a resistive element in the electronic circuitry, includes, in at least a first phase, activating the electronic circuitry to heat the sensing element to a temperature at which the sensing element is responsive to an analyte gas via energy input to the heating element in a pulsed manner and measuring a response of the sensing element over time to the pulsed energy input. The sensing element is operated in a mode in which the analyte gas is detected via a change in thermal conductivity from the response of the sensing element over time to the pulsed energy input in a lower temperature range and in a mode in which the analyte gas is detected via a combustion reaction of the analyte gas from the response of the sensing element over time to the pulsed energy input in a higher temperature range. In a number of embodiments, a constant resistance setpoint is set for the sensing element and energy (for example, voltage, current or a combination thereof) through the electronic circuity is variably controlled via the pulsed energy input toward achieving the constant resistance setpoint in at least the trigger mode of operation. Alternatively, a constant voltage setpoint maybe be set and energy (for example, voltage, current or a combination thereof) through the electronic circuity is variably controlled via the pulsed energy input toward achieving the constant voltage setpoint. Once again, such modes of operation may be brought into effect over any heating/cooling cycle of a sensing element.

The devices, systems, and methods hereof, along with the attributes and attendant advantages thereof, will best be appreciated and understood in view of the following detailed description taken in conjunction with the accompanying drawings.

DETAILED DESCRIPTION

Figure 1B:
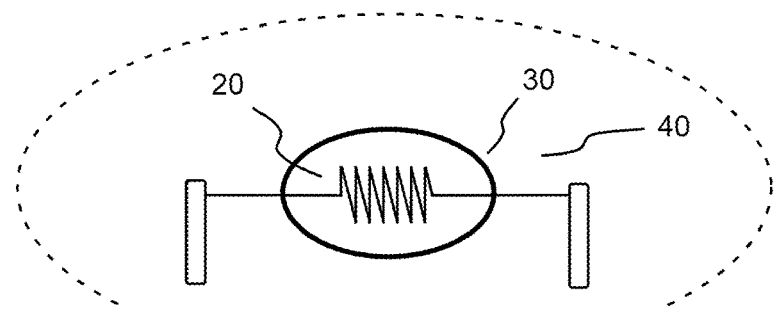
FIG. 1B illustrates schematically an enlarged view of the sensing element of the combustible gas sensor of FIG. 1A.

It will be readily understood that the components of the embodiments, as generally described and illustrated in the figures herein; may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etcetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a processor" includes a plurality of such processors and equivalents thereof known to those skilled in the art, and so forth, and reference to "the processor" is a reference to one or more such processors and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

In a number of embodiments hereof, combustible gas sensors are operated for gas detection in a dynamic mode wherein a constant resistance setpoint is established.

In many currently available sensors, a combustible gas sensing element is placed in or forms part of a Wheatstone bridge or a simulated Wheatstone bridge, and a predetermined constant voltage is applied that heats the element via Joule heating to an operating temperature sufficiently high for the catalyst on the element to catalyze reaction of the combustible analyte. For a number of representative sensing elements, the approximate desired temperature may be 450° C. The Callendar-Van Dusen equation, which describes the resistance of an element based on temperature, is as follows:

$$R = R_0[1+\alpha(T-T_0)] \qquad \text{Eq. 1}$$

Rearranged, this equation can be expressed as:

$$R - R_0 = \alpha R_0(T-T_0) \qquad \text{Eq. 2}$$

or $$\Delta R = \alpha R_0 \Delta T \qquad \text{Eq. 3}$$

In Equation 3 or Eq. 3, $R_0$ is the resistance of the element with no voltage applied at some ambient temperature $T_0$ and $\alpha$ is the temperature coefficient of resistance. Eq. 3 shows that the change in resistance is directly proportional to the change in temperature. If the starting temperature and resistance are known, either (1) the operating temperature can be derived via measurement of the operating resistance or (2) the operating resistance can be derived via measurement of the operating temperature. Measuring the resistance of a combustible gas sensing element to determine its temperature is a common method.

Figure 1A:
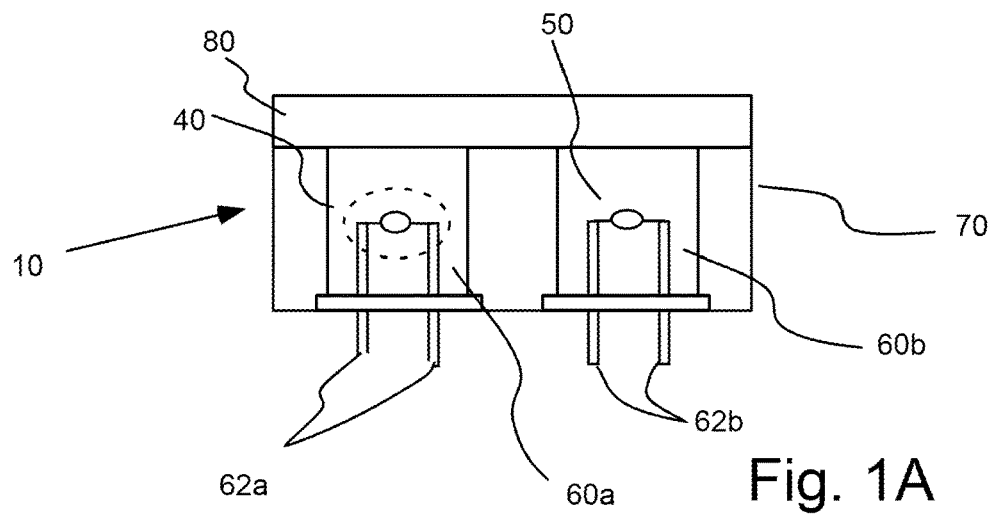
FIG. 1A illustrates schematically an embodiment of a conventional combustible gas sensor.
Figure 1C:
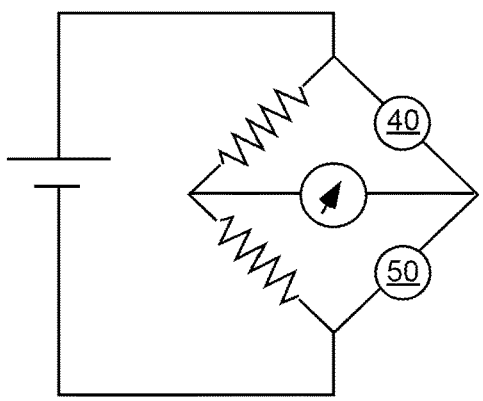
FIG. 1C illustrates a schematic view of a Wheatstone bridge circuit incorporating the sensing element and the compensating element of the combustible gas sensor of FIG. 1A.
Figure 2:
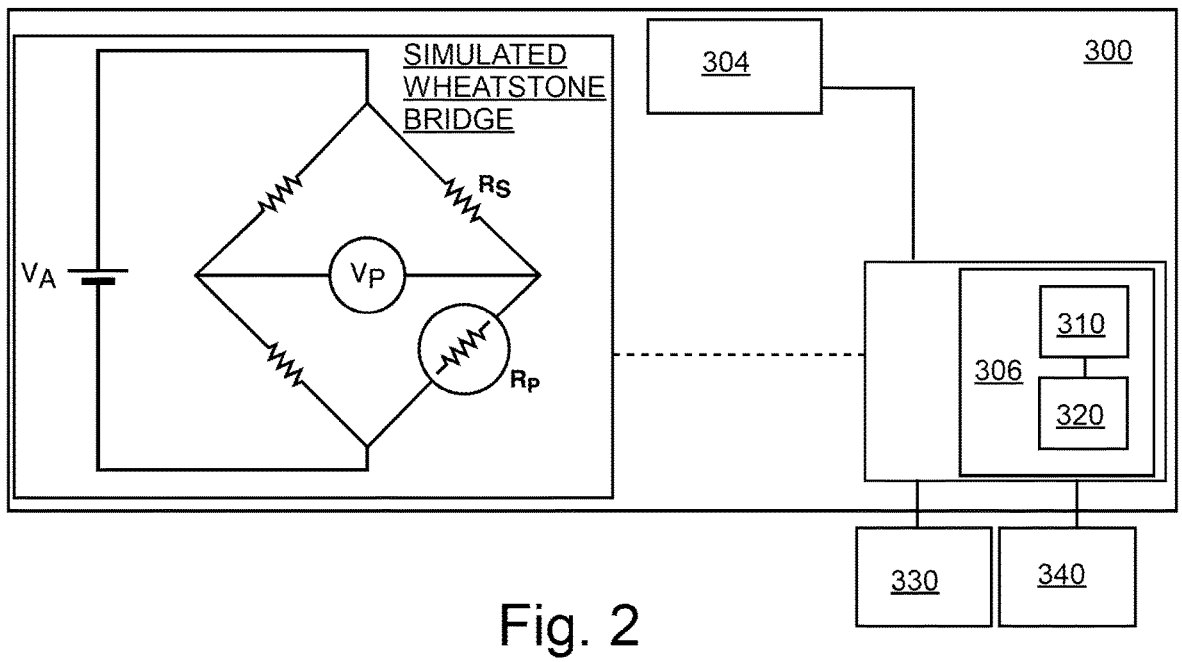
FIG. 2 illustrates an embodiment of circuitry for use in a sensor hereof including a simulated Wheatstone bridge circuity.

A sensor or sensor assembly or assemblies including pelements as, for example, illustrated in FIG. 1A, or including one or more low thermal mass pelements, or including one or more MEMS sensor assemblies as, for example, discussed in U.S. patent application Ser. No. 16/037,882, U.S. Pat. Nos. 8,826,721 and 9,228,967, the disclosures of which are incorporated herein by reference, may be placed in connection with electronic circuitry 300 hereof as illustrated in FIG. 2. Low thermal time constants associated with low thermal mass elements/sensors assist in providing quick response times, reducing the time an element may be unavailable for use in a detection mode and decrease power requirements. In a number of embodiments, low-thermal-mass elements hereof have a thermal time constant of 8 seconds or less, 6 seconds or less, 1 second or less, 0.5 seconds or less or 0.250 second or less. A low thermal mass/low thermal time constant sensor may, for example, include a MEMS pellistor as described above or a pelement of low thermal mass to provide a thermal time constant. As used herein the thermal time constant of an element is defined as the time required to change 63.2% of the total difference between its initial and final temperature when subjected to a step function change in drive power, under zero power initial conditions. MEMS pellistors typically have a lower thermal time constant than low-thermal-mass pelements. MEMS pellistors may, for example, have thermal time constants of 1 second or less, 0.5 seconds or less or 0.250 second or less.

Electronic circuitry 300 may, for example, be placed in electrical connection with electrically conductive contact elements (see, for example, contact posts 62a and 62b in FIG. 1A) of sensor elements hereof. In the case of a sensor fixed at a position within a facility, power may be provided from a remote source. As described above, in the case of a portable sensor, power source 304 may include one or more batteries. Electrical circuitry 300 of a sensor system hereof may also include a control system 306 which may, for example, include one or more processors 310 (for example, a microprocessor) and an associated memory system 320 in communicative connection with processor(s) 310. Control and or measurement algorithms may, for example, be stored in memory system 320 for execution by processor(s) 310. A user interface system 330 (including, for example, a data input system such as a touch screen display, keyboard, mouse, microphone etc. and/or a data output system such as a display, speaker, etc. to, for example, provide information to a user including, for example, concentration, speciation, alarms etc.) and a wired and/or wireless communication system 340 for transmitting and/or receiving data/information may also be provided in circuitry 300.

The terms "electronic circuitry", "circuitry" or "circuit," as used herein include, but is not limited to, hardware, firmware, software or combinations of each to perform a function(s) or an action(s). For example, based on a desired feature or need. a circuit may include a software controlled microprocessor, discrete logic such as an application specific integrated circuit (ASIC), or other programmed logic device. A circuit may also be fully embodied as software. As used herein, "circuit" is considered synonymous with "logic." The term "logic", as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software.

The term "processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

The term "controller," as used herein includes, but is not limited to, any circuit or device that coordinates and controls the operation of one or more input and/or output devices. A controller may, for example, include a device having one or more processors, microprocessors, or central processing units capable of being programmed to perform functions.

The term "logic," as used herein includes, but is not limited to, hardware, firmware, software or combinations thereof to perform a function(s) or an action(s), or to cause a function or action from another element or component. Based on a certain application or need, logic may, for example, include a software controlled microprocess, discrete logic such as an application specific integrated circuit (ASIC), or other programmed logic device. Logic may also be fully embodied as software. As used herein, the term "logic" is considered synonymous with the term "circuit."

The term "software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, or the desires of a designer/programmer or the like.

In the case of constant voltage operation, a circuit such as a Wheatstone bridge or simulation Wheatstone bridge as illustrated in FIG. 2 allows the combustible gas sensor element to come to thermal equilibrium with its environment. At particular environmental conditions with no combustible gas such equilibrium will result in a particular element resistance, $R_{P1}$, in the presence of similar environmental conditions with combustible gas present, the sensor element will react to the combustible analyte causing a temperature rise, and thus a change in resistance to a new resistance $R_{P2}$. This change in resistance may be detected via a change in voltage across or current through the sensor element which is measured or determined and analyzed by circuitry 300.

Changes in the system at equilibrium can be further described via the law of conservation of energy as follows:

$$\Delta E_E + \Delta E_C - \Delta E_T = 0 \qquad \text{Eq. 4}$$

In Eq. 4, $\Delta E_E$ represents changes to the electrical energy provided via the control circuitry, $\Delta E_C$ represents changes in chemical potential energy presented to the system, and $\Delta E_T$ represents changes the thermal loss of the element to the surrounding environment.

For the constant voltage example above, it can be assumed that $\Delta E_E$ is nearly 0 because voltage presented to the Wheatstone bridge or simulated Wheatstone bridge does not change, and only small changes in current are observed when the element is in analyte gas. Eq. 4 may thus be simplified to the following:

$$\Delta E_C = \Delta E_T \qquad \text{Eq. 5}$$

In that regard, changes in the chemical potential energy in the system are directly proportional to changes in temperature for a constant voltage mode of operation. Eq. 5 can be extended to:

$$\Delta E_C = hA\Delta T = hA\frac{\Delta R}{\alpha R_0} \qquad \text{Eq. 6}$$

In Eq. 6, h is the heat transfer coefficient, and A is the area. Eq. 6 shows that changes in chemical potential energy are directly proportional to changes in resistance in the system. R and $R_0$ here in Eq. 6 describe the full bridge resistance of $R_S+R_P$. However, $R_S$ is necessarily constant so $\Delta R = \Delta R_P$. The change in measured voltage given $\Delta R_P$ can be described as follows:

$$\Delta V = V_A \left( \frac{R_P + \Delta R}{R_0 + \Delta R} - \frac{R_P}{R_0} \right) \qquad \text{Eq. 7}$$

Eq. 7 can be solved for $\Delta R$ as follows:

$$\Delta R = \frac{R_0^2 * \Delta V}{R_S V_A - R_0 \Delta V} \qquad \text{Eq. 8}$$

When Eq. 8 is substituted for $\Delta R$ in Eq. 6 and solved for $\Delta V$, the result is:

$$\Delta V = V_A \left( \frac{R_S}{R_S + R_P} \frac{\Delta E_C}{\left(\frac{hA}{\alpha} + \Delta E_C\right)} \right) \qquad \text{Eq. 9}$$

The magnitude of the voltage signal has an asymptotic positive relationship to the change in chemical potential energy. The maximum possible signal in constant voltage mode is then described as a ratio of applied voltage, a ratio of the series resistor, $R_S$, and the pelement operating resistance, $R_P$ follows:

$$\Delta V_{MAX} = V_A \left( \frac{R_S}{R_S + R_P} \right) \qquad \text{Eq. 10}$$

Alternatively, a steady-state constant resistance mode of operation holds the temperature of the sensing element constant at particular environmental conditions by controlling R (see, for example, Eq. 3). Assuming the combustible gas sensing element consumes a concentration-proportional amount of the chemical potential energy via the combustion reaction, limited by mass transfer to the element, and thermal conductivity changes are small in comparison and thus can be ignored, Eq. 4 can then be re-written as:

$$\Delta E_C = -\Delta E_E \qquad \text{Eq. 11}$$

In that regard, changes in effective or mass-transfer limited chemical potential energy in the system are directly proportional to changes in electrical energy provided for the constant resistance mode of operation. This equation, at a particular instance in time, can be further written as follows:

$$\Delta E_C = -\Delta \left( \frac{V_A^2}{R_{CR}} \right) \qquad \text{Eq. 12}$$

In Eq. 12, $V_A$ is the voltage applied by the control circuitry to heat the element to $R_{CR}$, the constant resistance setpoint. To keep the resistance, $R_{CR}$, constant the control circuitry must change the applied voltage, $V_{CR}$, in response to changes in effective or mass-transfer limited chemical potential energy (that is, in the presence of analyte gas). Expanded, this equation may be set forth as:

$$\Delta E_C = \frac{V_{Ai}^2}{R_{CR}} - \frac{(V_{Ai} + \Delta V)^2}{R_{CR}} \qquad \text{Eq. 13}$$

In Eq. 13, $V_{Ai}$ is the initial voltage applied at ambient conditions and $\Delta V$ is the change in voltage supplied in response to changes in chemical potential energy. Eq. 13 shows that the change in voltage, $\Delta V$, is related to the square root of the change in chemical potential energy, $\Delta E_C$. When compared to Eq. 9, which shows that $\Delta V$ in constant voltage mode has an asymptotic positive relationship to the change in chemical potential energy, Eq. 13 further demonstrates that a constant resistance mode of operation results in a greater change in measured voltage for the same change in chemical potential energy.

Figure 3A:
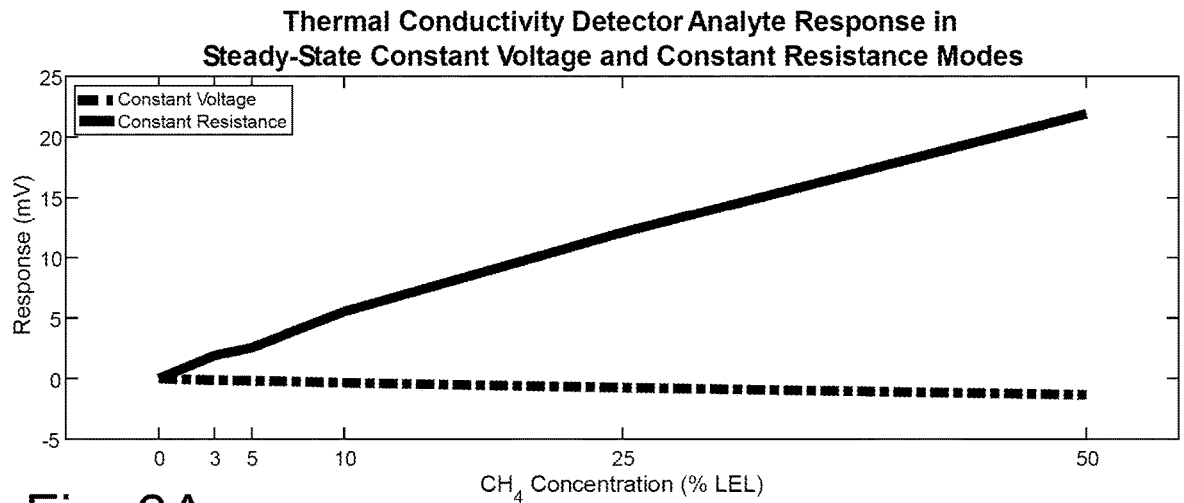
FIG. 3A illustrates a comparison of operating a thermal conductivity sensor in a constant resistance mode to operating the thermal conductivity sensor in a constant voltage mode.
Figure 3B:
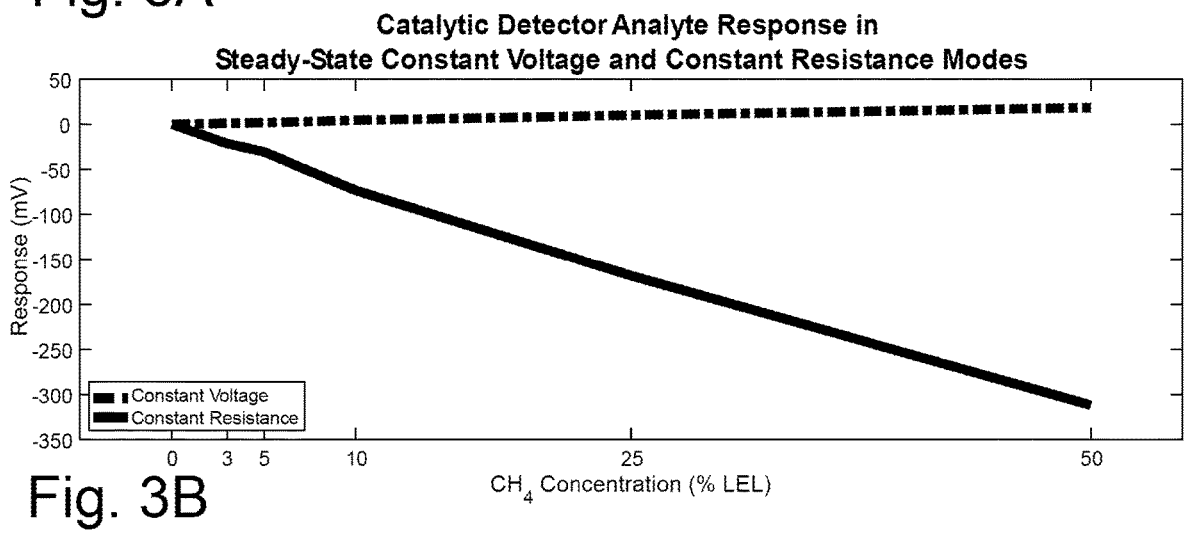
FIG. 3B illustrates a comparison of operating a catalytic combustible gas sensor in a constant resistance mode to operating the catalytic combustible gas sensor in a constant voltage mode.

Greater signal magnitude provides a significant motivation to consider a constant resistance mode of operation for analyte detection. It was observed that, in practice, the difference in signal amplitude in constant resistance mode is up to 50 times what is observed in constant voltage mode for the same concentration of analyte gas. Therefore the constant resistance operation may provide significant advantages. FIGS. 3A and 3B illustrates a graphical comparison of a thermal conductivity sensor and a catalytic combustible gas sensor, respectively, operated in a steady state, constant resistance control mode versus such sensors operated in constant voltage control mode.

Figure 4:
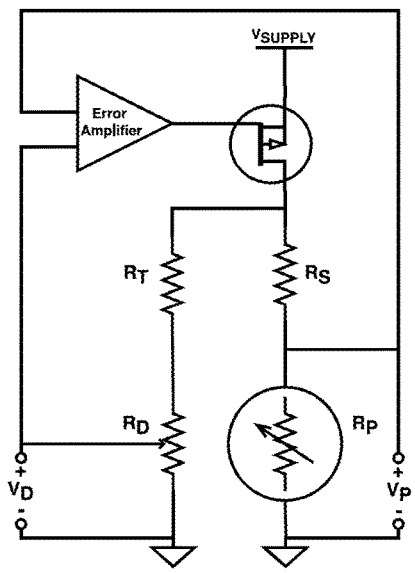
FIG. 4 illustrates an embodiment of a portion of electronic circuitry hereof for control with a constant resistance setpoint.

A constant resistance mode of operation or control may, for example, be achieved via a control circuit/system as illustrated in FIG. 4. In the system of FIG. 4, an error amplifier allows current to flow through, for example, a simulated Wheatstone bridge including $R_S$, $R_P$, $R_T$ and $R_D$, wherein $R_D$ may or may not have adjustable resistance. The error amplifier may, for example, adjust the current through the bridge to ensure that $V_D$ and $V_P$ match, which heats the combustible element, $R_P$, to its predetermined resistance setpoint. The relative values of $R_D$, $R_T$, and $R_S$ set the resistance of $R_P$ in this configuration. This relationship (for non-zero bridge voltages) is described as:

$$R_P = \frac{R_D}{R_T} R_S \qquad \text{Eq. 14}$$

Given the advantage of significant signal increase in constant resistance mode, operation of a combustible gas sensor "pseudo-constant" resistance/dynamic response mode was explored with a goal of greater voltage signal in analyte gas with similar power requirements when compared to dynamic response modes wherein a constant voltage is set. As described above, the modes of operation described herein may, for example, be described as a dynamic or pulse mode with a constant resistance setpoint.

A dynamic or pulse mode may be used with any sensor element and is particularly suitable for (but not limited to) low-thermal-mass elements such as low-thermal-mass pelements and MEMS hotplates/pellistors. In a dynamic or pulse mode, one quickly heats and cools a sensor element or elements in a pulsed power mode. An advantage to operating in pulse mode is significantly lower power consumption as compared to a continuous mode. Another advantage is improved span response as a result of adsorption of excess combustible gas on the catalyst at cooler temperatures during unpowered or lower powered operation (that is, during a REST time) as compared to continuously powering the catalyst at the run temperature of 100 to 700 C.

Pulse width modulation may, for example, be used to control the energy delivered to the heating element(s) of the trigger and primary sensors hereof. Pulse width modulation is a well-known control technique used to control the average power and/or energy delivered to a load. In embodiments hereof, a voltage is supplied to a heating element to heat the oxidative layer and supported catalyst/structure, when present, in a controlled manner. In the case of elements with relatively low thermal mass, the cycle times can be relatively short.

In a pulse mode of operation, heating energy (that is, heating voltage(s) or heating currents(s)) may be periodically supplied to the heating element(s) during an "ON time" in a "pulse mode". Rest energy (that is, rest voltage(s) or a rest current(s)), which is less than the heating energy may be supplied during a "REST time". The total of the higher-energy or ON time plus the lower-energy or REST time correspond to a cycle time or a cycle duration. Gas concentration of the analyte is measured during the ON time. The heating energy (voltages/currents) supplied during the ON time may be constant during the ON time or may be varied (for example, supplied as heating voltage/current plateau or as heating voltages/current ramp). The rest energy (voltages/currents) may be equal to zero, or be sufficiently lower than the heating energy so that the trigger gas sensor does not interact in a significant manner with (or consume an or substantially any) gas to be detected. Similar to the ON time, the rest energy supplied during the REST time may be constant during all of the REST time or may be varied (for example, supplied as rest voltage/current plateau or as rest voltage/current ramp). The cycle may be repeated.

The ON time duration may, for example, depend upon the thermal mass of the elements. An ON time duration may, for example, be in the range of 100 msec to 1 second or in the range of 300 msec to 500 msec in a number of embodiments hereof. In a number of embodiments, the ON time duration may be kept as short as possible to improve response time. In a number of embodiments, the duty cycle may, for example, be in the range of 5% to 12% (ratio of ON time/(ON time+REST time). In an illustrative or representative embodiment, the ON time is approximately 350 msec (that is, equal to or within 10% of that) and the duty cycle is approximately 10% (that is, equal to or within 20% of that value). In a representative example, the cycle time or cycle duration was 4000 msec, during which the ON time was 350 msec and the REST time was 3650 msec. Therefore, the duty cycle is 8.75%.

In a number of studied representative embodiments, a dynamic or pulse mode of operation with a constant resistance setpoint was applied by setting circuitry 300 to a constant resistance topology with a pelement at a duty cycle of 2.5 seconds ON-time every 7.5 seconds (33% duty cycle, 7.5 second period). When the constant resistance setpoint control is not enabled, the voltage on the pelement is set to 0V. In a number of such embodiments, the method had at least two phases including: (1) a first heating phase in which the energy (for example, voltage, current or a combination thereof) through the element is variably controlled to heat the element toward a predetermined setpoint resistance for a predetermined amount of time, wherein thermal equilibrium may or may not be reached and (2) a second phase in which the energy is removed from the element for a predetermined amount of time to allow it to cool. This procedure is sometimes referred to herein as Procedure No. 1.

Figure 5:
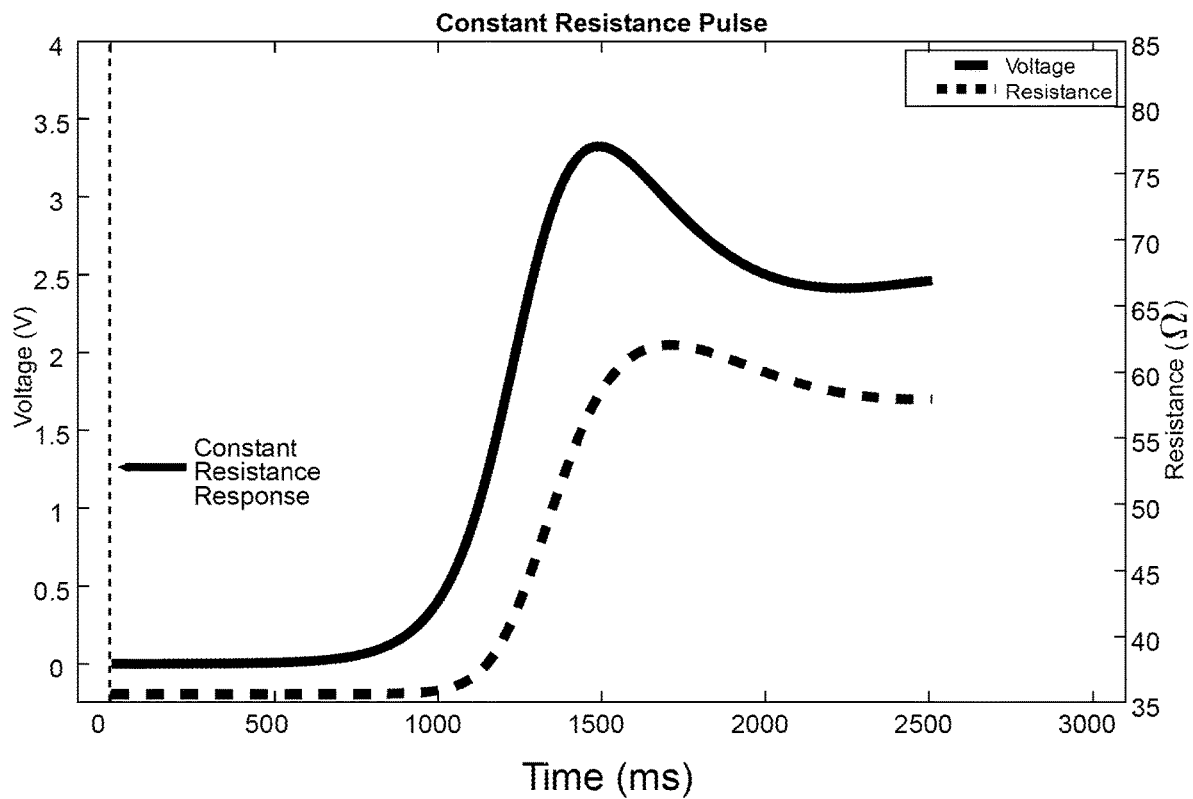
FIG. 5 illustrates output of a sensor hereof to a dynamic/pulse input with a constant resistance setpoint wherein the vertical broken line represents beginning of the dynamic/pulse input wherein the voltage applied to the element at the resistance setpoint is applied over 2.5 seconds as the element heats toward the operating resistance setpoint.
Figure 6:
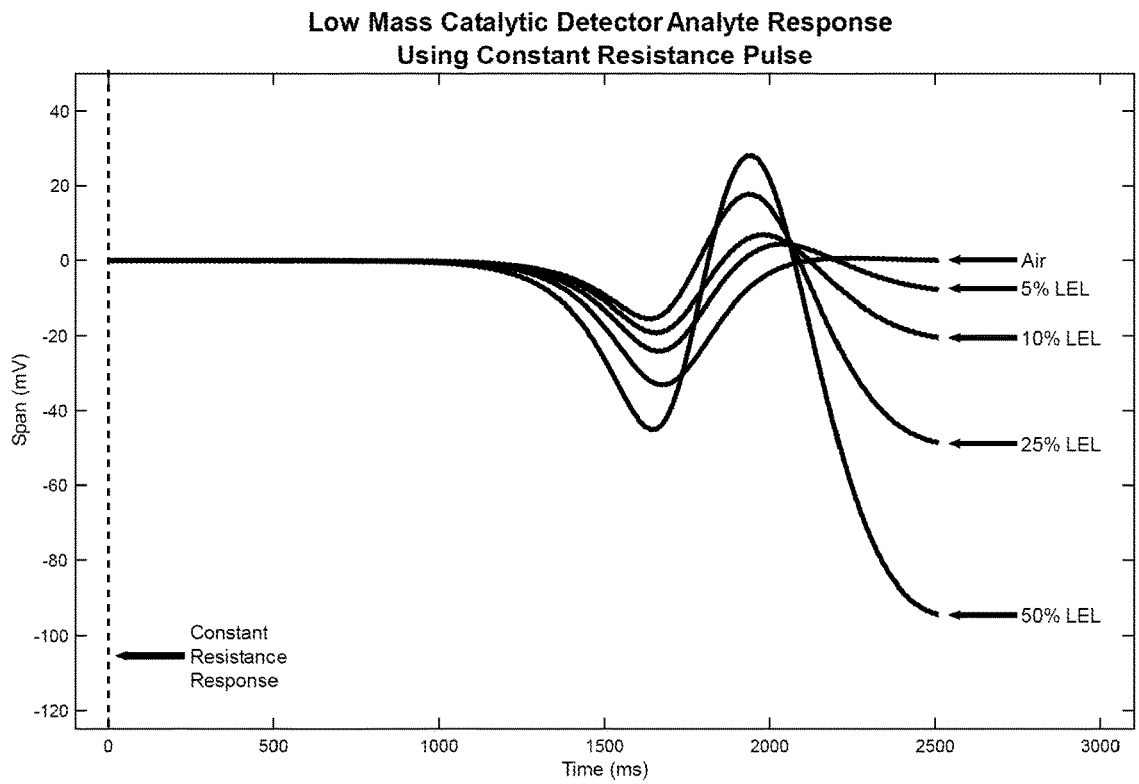
FIG. 6 illustrates the response of a low-thermal-mass combustible gas pelement hereof to a dynamic/pulse input with a constant resistance setpoint in the presence of different concentrations of methane.
Figure 7:
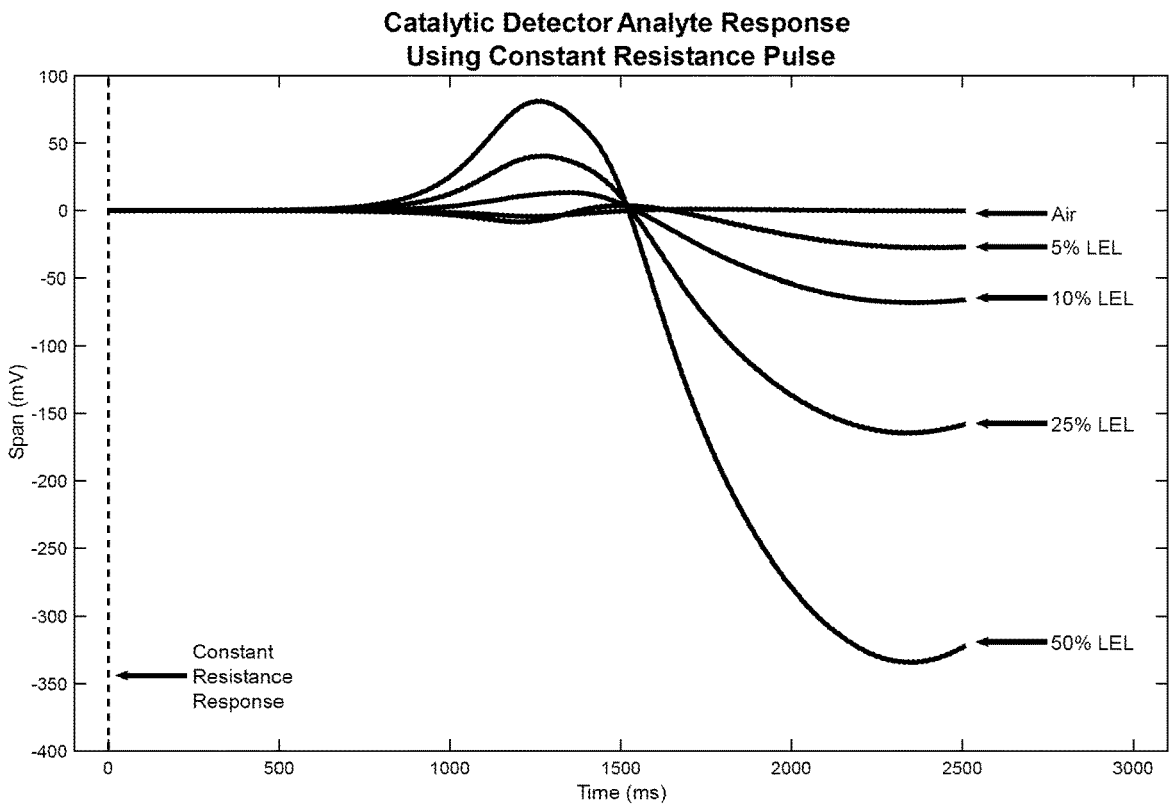
FIG. 7 illustrates the response of a standard combustible gas pelement hereof to a dynamic/pulse input with a constant resistance setpoint in the presence of different concentrations of methane set forth as % of lower explosion limit or LEL.
Figure 8:
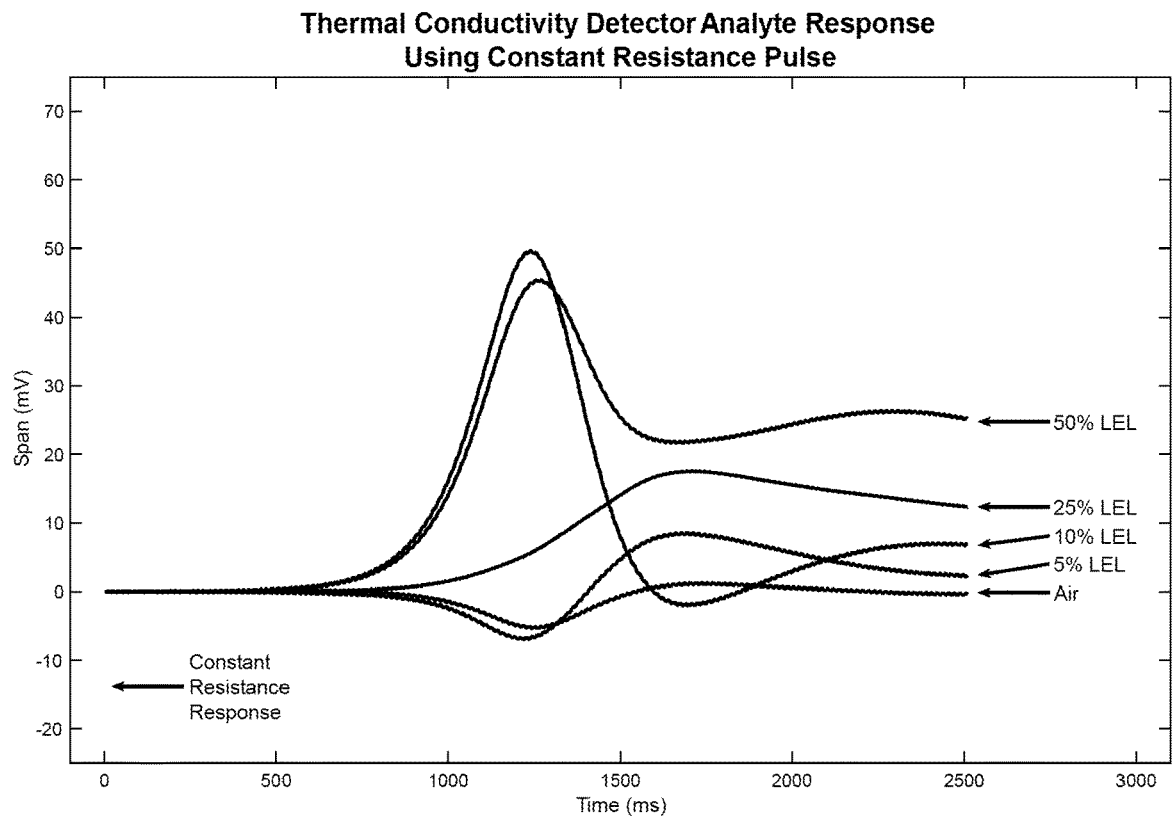
FIG. 8 illustrates the response of a thermal conductive pelement hereof including no catalyst to a dynamic/pulse input with a constant resistance setpoint in the presence of different concentrations of methane.

A resulting response waveform is illustrated in FIG. 5. FIG. 5 shows the voltage applied to the pelement, $V_P$, at a particular resistance setpoint, $R_{CR}$, over 2.5 seconds as the element heats toward the operating resistance setpoint. In this example of Procedure No. 1 operation, the pelement does not reach thermal equilibrium because the resistance is never constant (reference Eq. 3). This methodology was applied to a standard pelement such as that used in an MSA XCELL® combustible gas sensor (available from MSA Safety Incorporated of Cranberry Township, Pennsylvania). The methodology was also applied to low-thermal-mass combustible pelements and to "thermal conductivity pelements" over a variety of concentrations of methane. In the studies hereof thermal conductivity pelements were manufactured in the same manner as combustible gas pelements (whether low-thermal-mass or conventional pelements) but included no catalyst. The change in the dynamic, constant-resistance-setpoint voltage response across different concentrations of methane are shown in FIGS. 6-8. As clear to those skilled in the art, the current through the pelement could alternatively have been measured. The "standard" MSA XCELL combustible gas, sensor pelements were spheres approximately 430 microns in diameter including a ceramic catalyst support and a noble metal oxidation catalyst. The low-thermal-mass" pelements were spheres approximately 260 microns in diameter including a ceramic catalyst support and a noble metal oxidation catalyst. Low-thermal-mass pelements are, for example, discussed in U.S. Pat. No. 8,826,721, the disclosure of which is incorporated herein by reference. The thermal conductivity pelements were spheres approximately 260 microns in diameter including a ceramic catalyst support and no catalyst.

FIGS. 6, 7 and 8, demonstrate that dynamic, pulsed or duty-cycled operation of all three types of tested elements with a constant resistance setpoint produces a usable dynamic signal that is sufficient to distinguish concentration of analyte gas whether the element may or may not have reached thermal equilibrium. However, for certain operational embodiments, it would be desirable to reduce response time. The response time of the elements in FIGS. 6, 7 and 8 is, for example, slower than the response time for operation in a dynamic or pulse mode of operation with a constant voltage setpoint which may, for example, might use an 8.75% duty cycle and a 4 second period.

Figure 9:
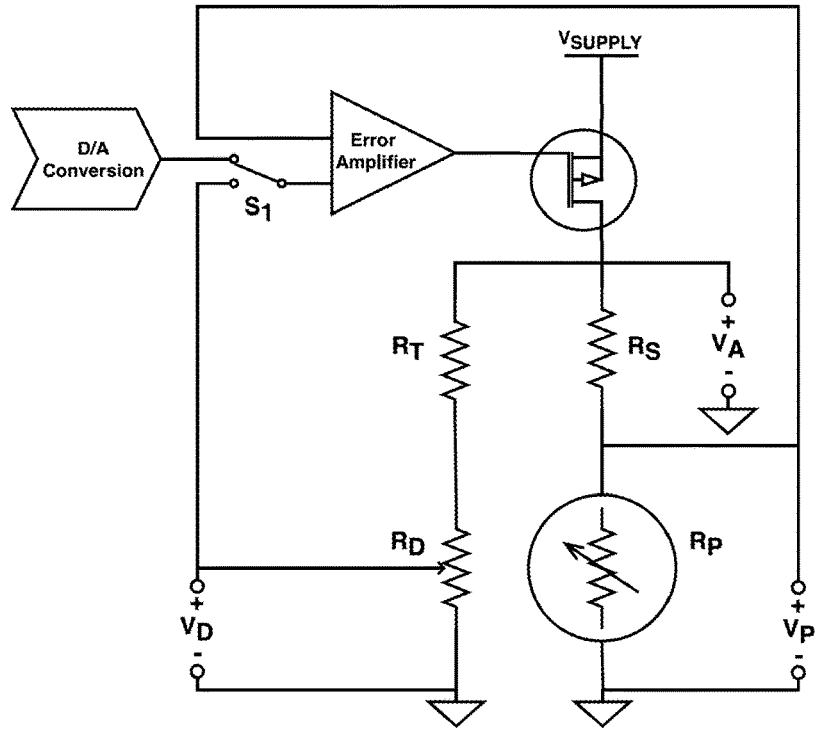
FIG. 9 illustrates an embodiment of circuitry hereof to effect a preliminary phase which may be considered a pre-heating or bridge unbalancing phase.

To enable faster response times, the dynamic procedure applied to the combustible elements was modified to acid a preliminary phase which may be considered a pre-heating or bridge unbalancing phase. The energy applied to the combustible element during such a preliminary phase may, for example, be constant (for example, a constant voltage or a constant current) or vary (for example, ramping), in control of the circuit of FIG. 4, $V_D$ and $V_P$ are set equal in a constant resistance setpoint mode of operation. $V_D$ and $V_P$ are equal when the voltages are 0 and when Eq. 14 is true. In FIGS. 5 through 8, there is a zero response for approximately 1000 ms. In these embodiments, one is relying upon noise in the system to unbalance a zero setpoint. An embodiment of a portion of circuitry to achieve an "unbalancing" methodology by placing a non-zero voltage on the bridge circuit is shown in FIG. 9. In a number of embodiments of this mode of operation, the combustible gas sensing element (for example, a pelement) is initially set to 0V by setting the D/A reference voltage to 0V. Subsequently, for a short period of time (for example, 10 ms), a non-zero voltage is applied to the pelement (for example, 2V) by changing the D/A reference voltage. This phase of operation initializes the heating of the pelement and creates imbalance in the bridge circuitry. Alternatively, the heating pulse may be applied to the entire simulated bridge, $V_A$. After the heating period has elapsed, $S_1$ switches position to enable the constant resistance setpoint topology described above for the remainder of the pulse period (for example, 2490 ms). In such embodiments, the method includes the following three phases: (1) an initial heating phase of a predetermined time wherein the voltage on the element is raised (for example, to a constant predetermined setpoint) to initialize the heating of the element (during which phase, thermal equilibrium is not reached); (2) a second heating phase wherein the energy (for example, voltage, current or a combination thereof) through the element is variably controlled to heat the element toward a constant resistance setpoint for a predetermined amount of time (during which, thermal equilibrium may or may not be reached); and (3) a third phase wherein the energy is removed from the element for a predetermined amount of time to allow the element to cool. This procedure is sometimes referred to herein as Procedure No. 2.

Figure 10:
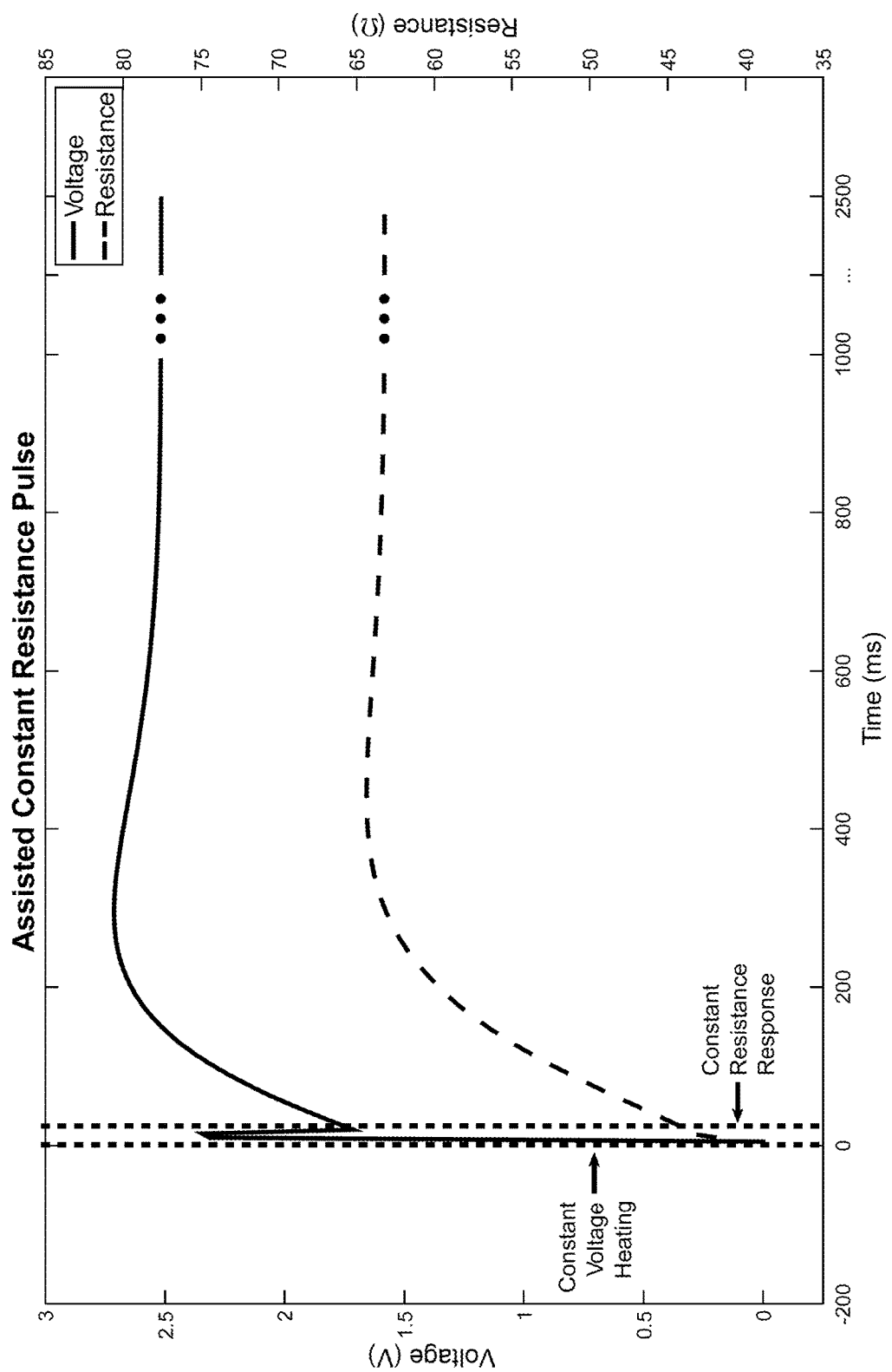
FIG. 10 illustrates output of a sensor hereof to a dynamic/pulse input with a constant resistance setpoint including a bridge unbalancing phase wherein the first vertical broken line represents the beginning of a preliminary, constant-voltage heating phase to unbalance the circuit, and the second vertical broken line represents beginning of the dynamic/pulse input.

During, the process of Procedure No. 2, voltage across the pelement, $V_P$, may be monitored by circuitry 300 hereof. A representative example of the resulting dynamic response is illustrated in FIG. 10. In the studies, of FIG. 10, an energy pulse was applied using a duty cycle of 2.5 seconds ON-time every 7.5 seconds (33% duty cycle, 7.5 second period).

When compared to the results of FIG. 5, it is apparent that the voltage applied to the pelement reaches a maximum value significantly faster, at approximately 250 ms in FIG. 10, compared to 1500 ms in FIG. 5. The faster response enables a voltage signal to be determined from the dynamic response at an earlier time in the response waveform and, therefore, at lower operational power usage. In addition, the element may reach thermal equilibrium near the end of the applied pulse (>1000 ms), but thermal equilibrium is not reached at the beginning of the pulse (<1000 ms) because the resistance is changing over time (reference Eq. 3).

Figure 11:
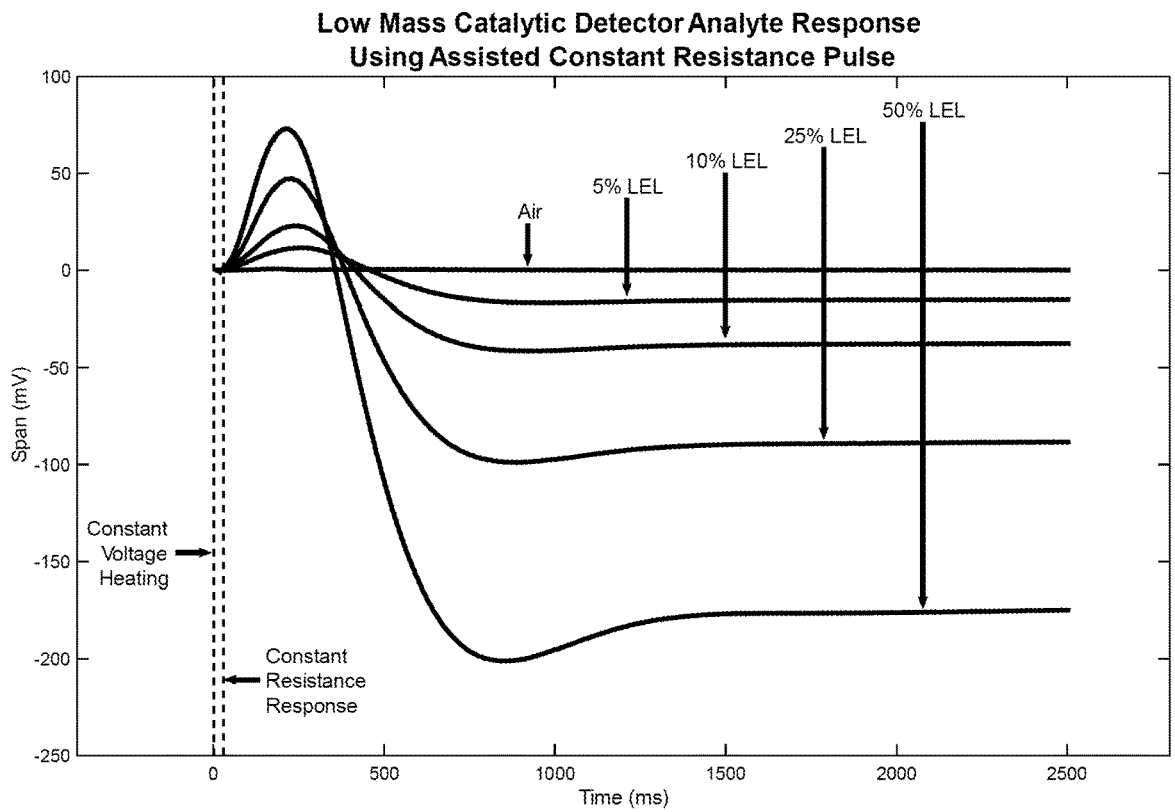
FIG. 11 illustrates the response of a low-thermal-mass combustible gas pelement hereof to a dynamic/pulse input with a constant resistance setpoint in the presence of different concentrations of methane wherein the dynamic/pulse input follows a preliminary bridge unbalancing phase.
Figure 12:
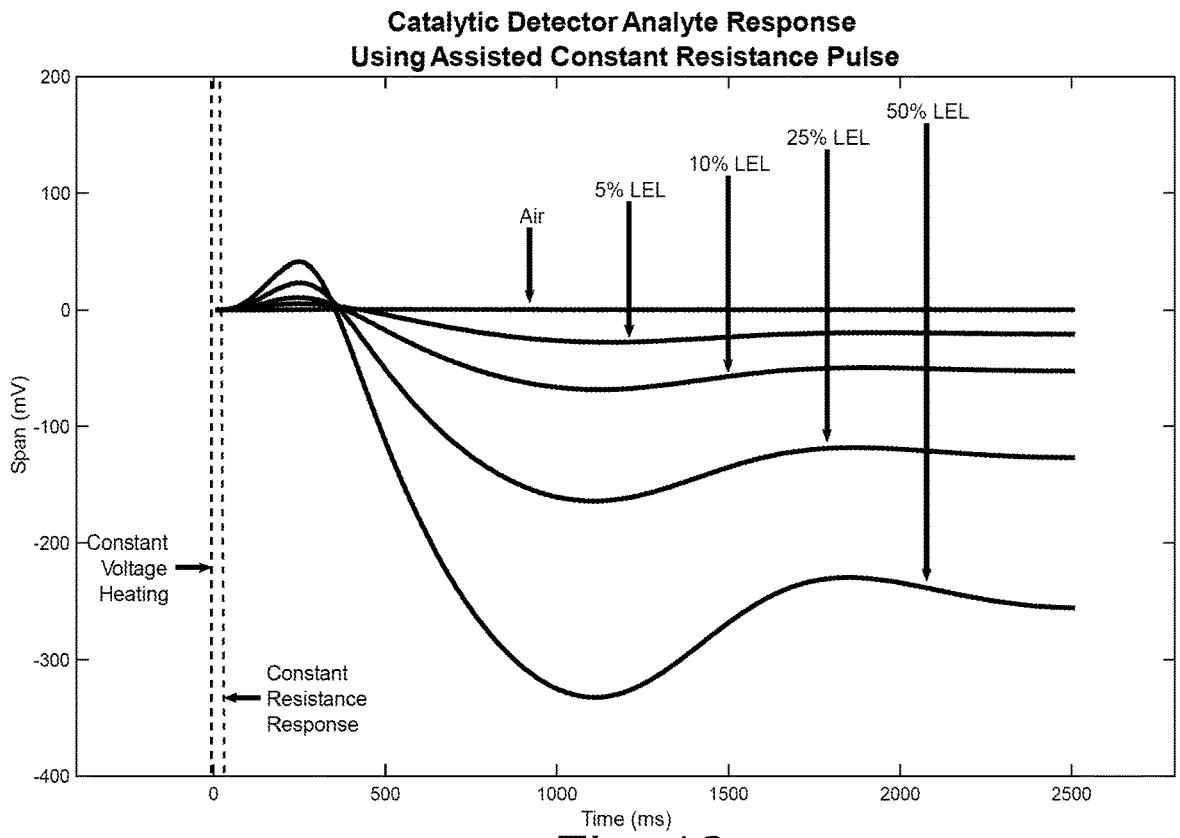
FIG. 12 illustrates the response of a standard combustible gas pelement hereof to a dynamic/pulse input with a constant resistance setpoint in the presence of different concentrations of methane wherein the dynamic/pulse input follows a preliminary bridge unbalancing phase.
Figure 13:
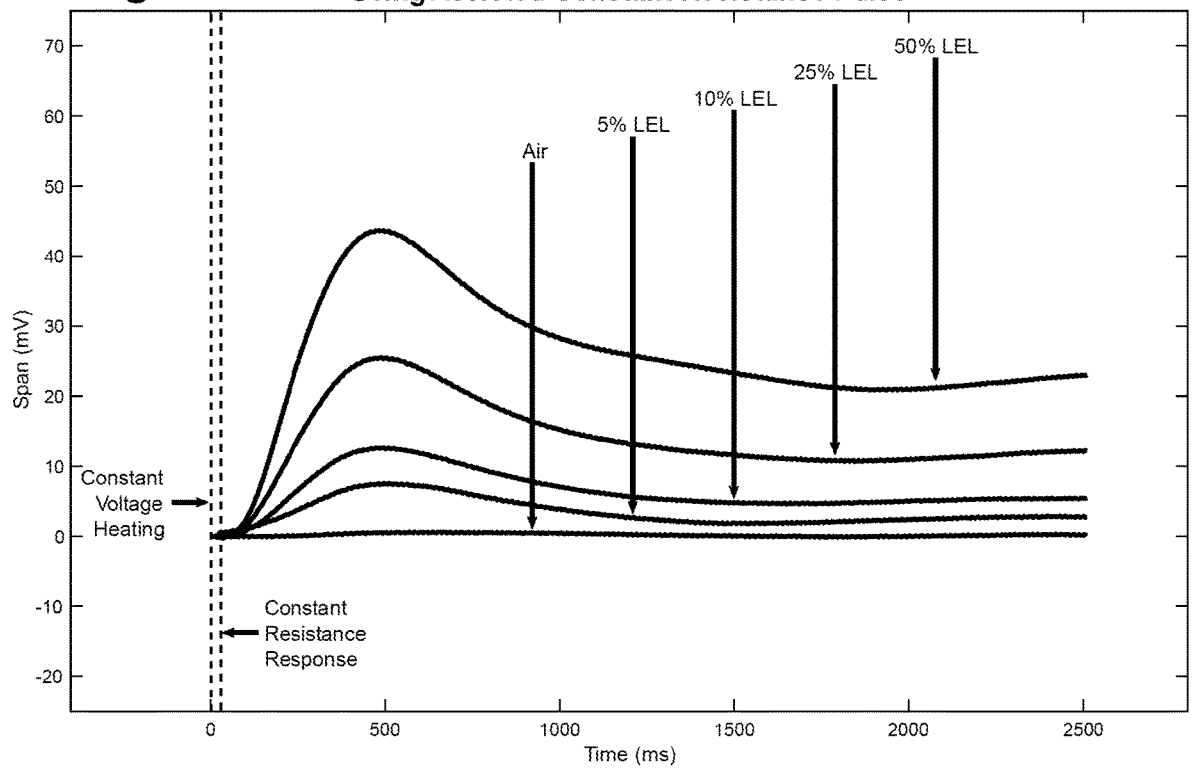
FIG. 13 illustrates the response of a thermal conductive pelement hereof including no catalyst to a dynamic/pulse input with a constant resistance setpoint in the presence of different concentrations of methane wherein the dynamic/pulse input follows a preliminary bridge unbalancing phase.

The dynamic or pulsed operational methodology of Procedure No. 2 was applied to standard MSA XCELL combustible gas sensor pelements, low-thermal-mass combustible gas sensor pelements, and thermal conductivity combustible gas sensor pelements (as described above) over a variety of concentrations of methane. The changes in the dynamic voltage response (under constant-resistance-setpoint control) across different concentrations of methane for such pelements are shown in FIGS. 11, 12 and 13. Once again, to equivalent effect, the current through the pelement could alternatively have been measured.

FIGS. 11, 12 and 13 demonstrate that it is possible to obtain significant signal earlier in the dynamic response (under constant-resistance-setpoint control) by using an initial heating or bridge unbalancing step/phase (for example, at constant voltage) during which the element may or may not have reached thermal equilibrium. In addition, FIGS. 11 and 12 show that, while larger elements or detectors are capable of greater signal, smaller elements or detectors are capable of faster response times.

Although circuits hereof such as the representative embodiment illustrated in FIG. 4 are sometimes referred to as bridge circuits or simulated bridge circuits herein, such circuits are operated in the manner of a bridge only in control of the circuit to a constant resistance setpoint via balancing, or holding equal $V_D$ and $V_P$. The circuits are not used in the manner of a bridge during response measurement. Indeed, as $V_D$ and $V_P$ are being controlled to be held equal, one cannot use the "bridge" circuity to measure changes. In that regard, the left side of the "bridge" of FIG. 4 is not used in response measurement. In other words, the left side of the circuit need not be used as a reference in response measurement. Response may, for example, be referenced to ground. To measure response, one may, for example, simply measure the current through $R_P$. Any circuitry suitable to measure, for example, current through or voltage across $R_P$, $R_S$, $R_T$, $R_D$, or the combination of $R_P$ and $R_S$, or the combination of $R_D$ and $R_T$ may be used to measure response in circuits hereof.

Important issues to address in, a number of embodiments of dynamic, constant-resistance-setpoint, analyte gas response include: (1) providing a duty cycle that is sufficiently low when compared with existing methods; and (2) managing the voltage on the sensing element, which is bounded only by the supply voltage, $V_{SUPPLY}$, during the initial heating phase. The current during heating of an element under constant-resistance-setpoint control can reach theoretical maximums which are above currents that, for example, an integrating device may be able to provide from a particular battery, resulting in a brown-out event. In a number of embodiments, the pulse procedure and control methodology was further adapted to address such issues. To address the brown-out issue in a number of embodiments hereof, an additional circuitry component or components was/were integrated into the electrical circuitry hereof to ensure that the voltage on the element does not increase above a predetermined threshold voltage. A representative embodiment of such a circuitry topology is illustrated in FIG. 14A.

Figure 14A:
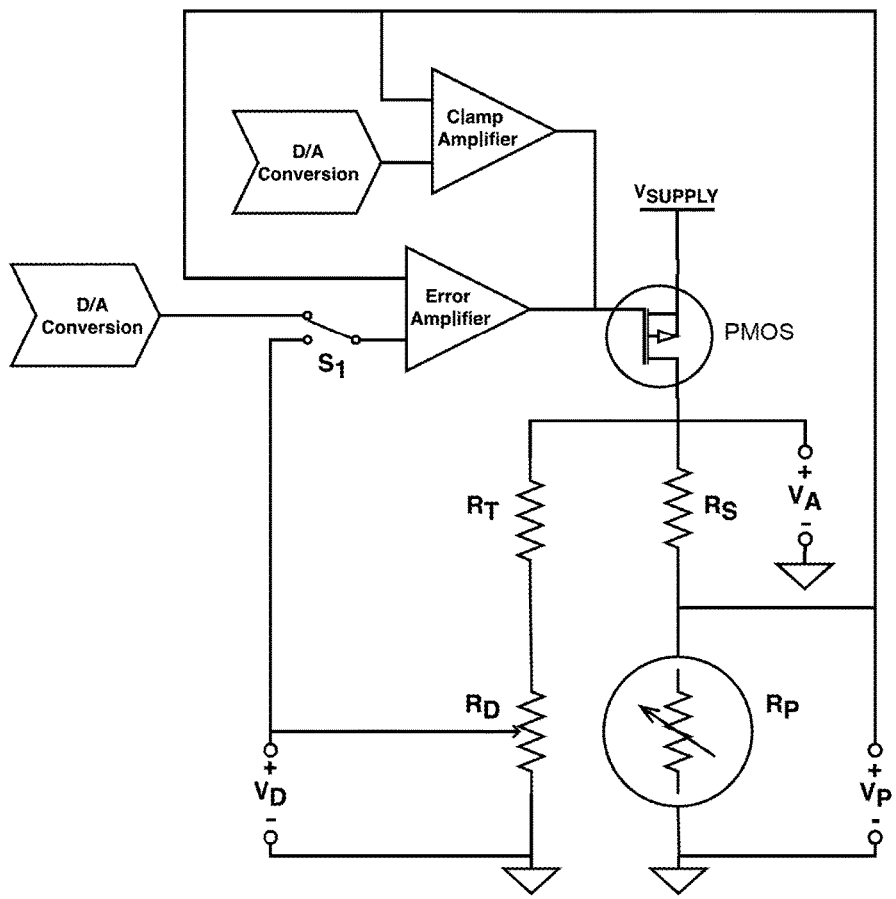
FIG. 14A illustrates an embodiment of circuitry topology hereof including an active clamp circuit that monitors the voltage on the element during application of a dynamic/pulse input with a constant resistance setpoint and clamps the voltage at a predetermined threshold level based on a D/A reference voltage.

The embodiment of the circuitry topology illustrated in FIG. 14A includes the addition of an active clamp circuit that may, for example, monitor the voltage on the pelement, $V_P$, based on a D/A reference voltage, if the error amplifier attempts to raise the voltage of the pelement above the predetermined threshold while the clamp circuitry is enabled, this clamp circuitry overrides the error amplifier and maintains the voltage on the pelement. To the same or similar effect, the clamp circuitry may be passively monitored (for example, by a Zener diode) and other voltages may be monitored (for example, the voltage applied to the simulated Wheatstone bridge, $V_A$). One may, for example, monitor or measure $V_A$, $V_P$, $V_D$, or current and clamp $V_P$ or monitor or measure $V_A$, $V_P$, $V_D$, or current and clamp $V_A$. Likewise, on may monitor current or some combination (or function) of voltage and/or current to determine if a threshold value is met.

In a number of embodiments, the pelement is initially set to 0V by setting the D/A reference voltage to 0V. Then, for a short period of time (for example, 10 ms) a non-zero voltage is applied to the pelement (for example, 2V) by changing the D/A reference voltage. This initializes the heating of the pelement and unbalances the bridge as described above. Once again, such a heating pulse may be applied to the entire simulated bridge, $V_A$. After the initial heating period has elapsed, $S_1$ switches position to enable the constant resistance setpoint topology described above for the remainder of the pulse period (for example, 500 ms). Throughout the procedure, the clamp circuitry is enabled to ensure that the monitored voltage does not raise above the predetermined threshold. If it does, the clamp circuitry overrides the error amplifier until the pelement is sufficiently heated, at which point the error amplifier regains control and will maintain the pelement resistance, $R_{CR}$. The method thus includes five phases as demonstrated in the study of FIG. 15: (1) an initial heating phase of a predetermined time where the voltage on the element may be raised to, for example, a constant predetermined setpoint to initialize the heating of the element (during which thermal equilibrium is not reached); (2) a second heating phase wherein the energy (for example, voltage, current or a combination thereof) through the element is variably controlled to heat the element toward a constant resistance setpoint for a variable amount of time (during which thermal equilibrium is not reached) (3) a third phase wherein the voltage on the element is held constant for a variable amount of time while the element heats toward its setpoint temperature/resistance (during which thermal equilibrium is not reached); (4) a fourth phase wherein the energy (for example, voltage, current or a combination thereof) through the element is variably controlled to heat the element toward a constant resistance setpoint for a variable amount of time (during which thermal equilibrium may or may not be reached); and (5) a fifth phase where the energy is removed from the element for a predetermined amount of time to allowed it to cool. In total, phases 2, 3, and 4 occur for a predetermined amount of time in the embodiment of FIGS. 14A and 15. However, individually, the time in each of these phases is variable based on the heating characteristics and environmental conditions around the element. This procedure is sometimes referred to herein as Procedure No. 3.

Figure 15:
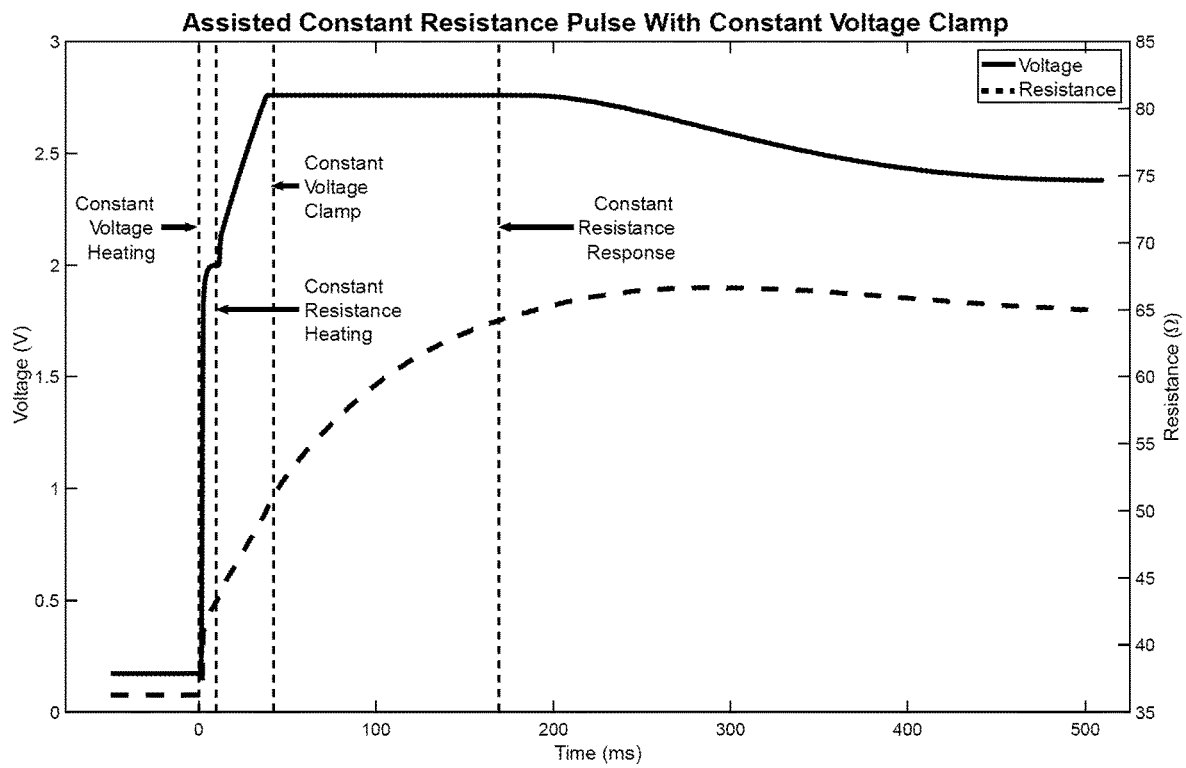
FIG. 15 illustrates output of a sensor hereof to a dynamic/pulse input with a constant resistance setpoint including a bridge unbalancing phase wherein the first vertical broken line represents the beginning of a preliminary, constant-voltage heating phase to unbalance the circuit, the second vertical broken line represents beginning of the dynamic/pulse input, a third vertical broken line represents beginning of a clamped/constant voltage phase, and a fourth vertical line represents an end of the clamped/constant voltage phase and resumption of the dynamic/pulse input with the constant resistance setpoint.

During the process of Procedure No. 3, the voltage across the pelement, $V_P$, may be monitored by circuitry 300. A representative example of the resulting dynamic response is illustrated in FIG. 15. Energy was applied to the sensing element using a duty cycle of 0.5 seconds every 5 seconds (10% duty cycle, 5 second period). To equivalent effect, the voltage of the entire simulated bridge, $V_A$, or the current through the pelement may be monitored. In FIG. 45, at time T=0 the voltage on the pelement is increased from 0V to 2V in constant voltage mode before the circuitry is switched to a constant resistance topology at T=10 ms, From T=10 ms to approximately T=40 ms, the error amplifier is increasing the voltage on the pelement to heat it to the resistance setpoint, $R_{CR}$. At approximately T=40 ms the voltage on the pelement reaches 2.75V, the maximum/threshold reference voltage on the clamp monitoring circuit in the representative embodiment. Therefore, at approximately T=40 ms the clamp circuitry overrides the error amplifier and holds the voltage constant until approximately T=175 ms. At this time, the pelement is sufficiently heated, and the error amplifier regains control and regulates the resistance of the pelement to the setpoint. $R_{CR}$. In the illustrated study, the element does not reach, thermal equilibrium by the end of the predetermined pulse time because the resistance is changing over time (reference Eq. 3).

Figure 14B:
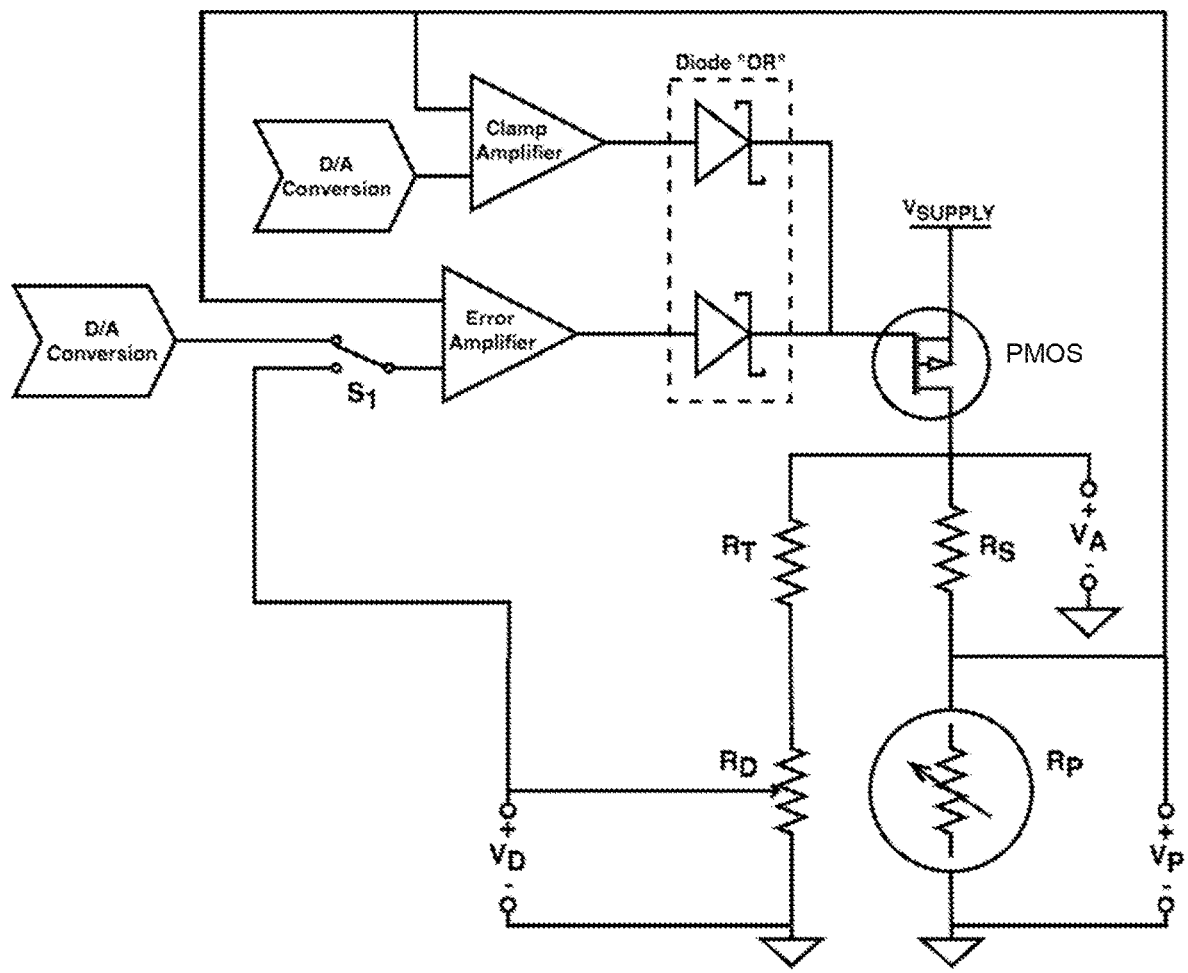
FIG. 14B illustrates another embodiment of circuitry topology hereof including an active clamp circuit.

With reference to the representative embodiments of FIGS. 14A and 14B, to deliver power to the bridge circuitry in that embodiment, the error amplifier drives the voltage at the output of the amplifier low. In effect, this turns the PMOS transistor on, and enables current to flow, in the configuration of the illustrated embodiment, the lower the voltage at the gate of the transistor (that is, at the output of the amplifier) the greater the current that is allowed to flow from the power supply to the bridge. In that regard, if 0V is applied to the gate of the transistor it is 100% on, and the full supply voltage will be applied to the bridge. If the power supply voltage is applied the gate of the transistor, it is 100% off, and the voltage on the bridge will be 0V. In other words, the voltage at the gate of the PMOS transistor is inversely proportional to the voltage on the bridge.

When enabled, the clamp amplifier may be configured for constant voltage operation at a specified voltage. It is also attempting to turn the PMOS transistor on by driving the voltage at its output low. In this way, the error amplifier and the clamp amplifier are competing for control of the gate of the PMOS transistor in the illustrated embodiment.

In the illustrated embodiment, the circuitry is configured such that the amplifier with the higher output voltage (that is, the amplifier that is attempting to control the bridge to a lower voltage) is the amplifier that controls the gate of the PMOS. Table 1 below describes the process discussed above in the context of Procedure No. 3. There are a number of ways the control scheme of Table 1 can be achieved. In a representative embodiment as illustrated in FIG. 14B, a "Diode Or" configuration was used, fin other embodiments, the functionality of the clamp amplifier and error amplifier may be integrated into a single amplifier.

TABLE 1

| Phase | Assumptions | Amplifier Response |
|---|---|---|
| (1) an initial heating phase of, for example, a predetermined time where the voltage on the element may be raised to, for example, a constant predetermined setpoint to initialize the heating of the element | Assume the clamp reference > initial heating setpoint | Output of the error amplifier > output of the clamp amplifier, therefore output of the error amplifier dominates. |
| (2) a second heating phase wherein the energy through the element is variably controlled to heat the element toward a constant resistance setpoint for a | In this phase the error amplifier is heating the pelement. It senses that the pelement has not reached its setpoint yet, so it is increasing the applied voltage from what was applied in Phase | Output of the error amplifier > output of the clamp amplifier, therefore the output of the error amplifier dominates. |

TABLE 1-continued

| Phase | Assumptions | Amplifier Response |
|---|---|---|
| (3) a third phase wherein the voltage on the element is held constant for a variable amount of time while the element heats toward its setpoint temperature/resistance | (1) In this phase the error amplifier has attempted to raise the voltage of the pelement above the clamp amplifier reference voltage to continue to heat the pelement to its setpoint resistance. | Output of the error amplifier < output of the clamp amplifier, therefore the output of the clamp amplifier dominates. |
| (4) a fourth phase wherein the energy through the element is variably controlled to heat the element toward a constant resistance setpoint for a variable amount of time | In this phase the resistance of the pelement is at or near the final setpoint resistance. Therefore, the error amplifier may still be trying to heat the pelement above what will be the final quiescent applied voltage but below the clamping setpoint. | Output of the error amplifier > output of the clamp amplifier, therefore the output of the error amplifier dominates. |

The dynamic or pulsed operational methodology of Procedure No. 3 as described above was applied to standard MSA XCELL combustible gas sensor pelements and thermal conductivity combustible gas sensor pelements (as described above) over a variety of concentrations of methane. The change in the dynamic, constant-resistance-setpoint, voltage response across different concentrations of methane are illustrated in FIGS. 16 and 17.

Figure 16:
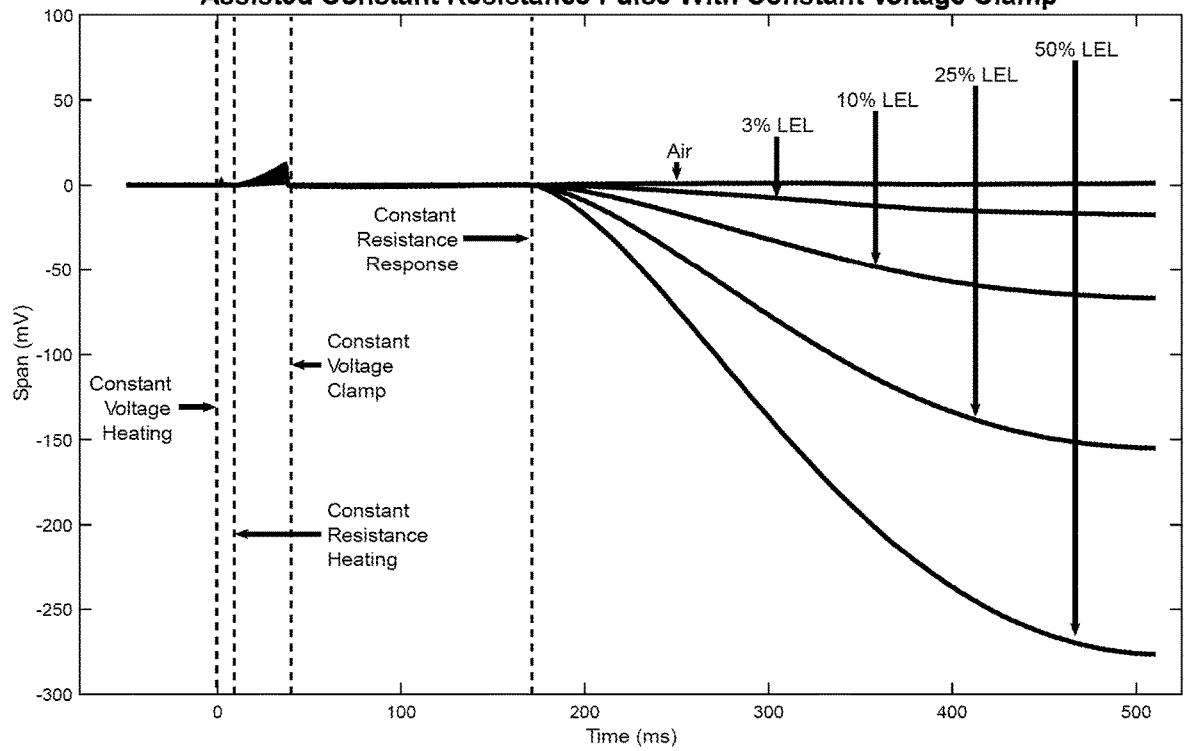
FIG. 16 illustrates the response of a combustible gas pelement hereof to a dynamic/pulse input with a constant resistance setpoint in the presence of different concentrations of methane wherein the dynamic/pulse input follows a preliminary bridge unbalancing phase and is resumed after a clamped voltage phase.
Figure 17:
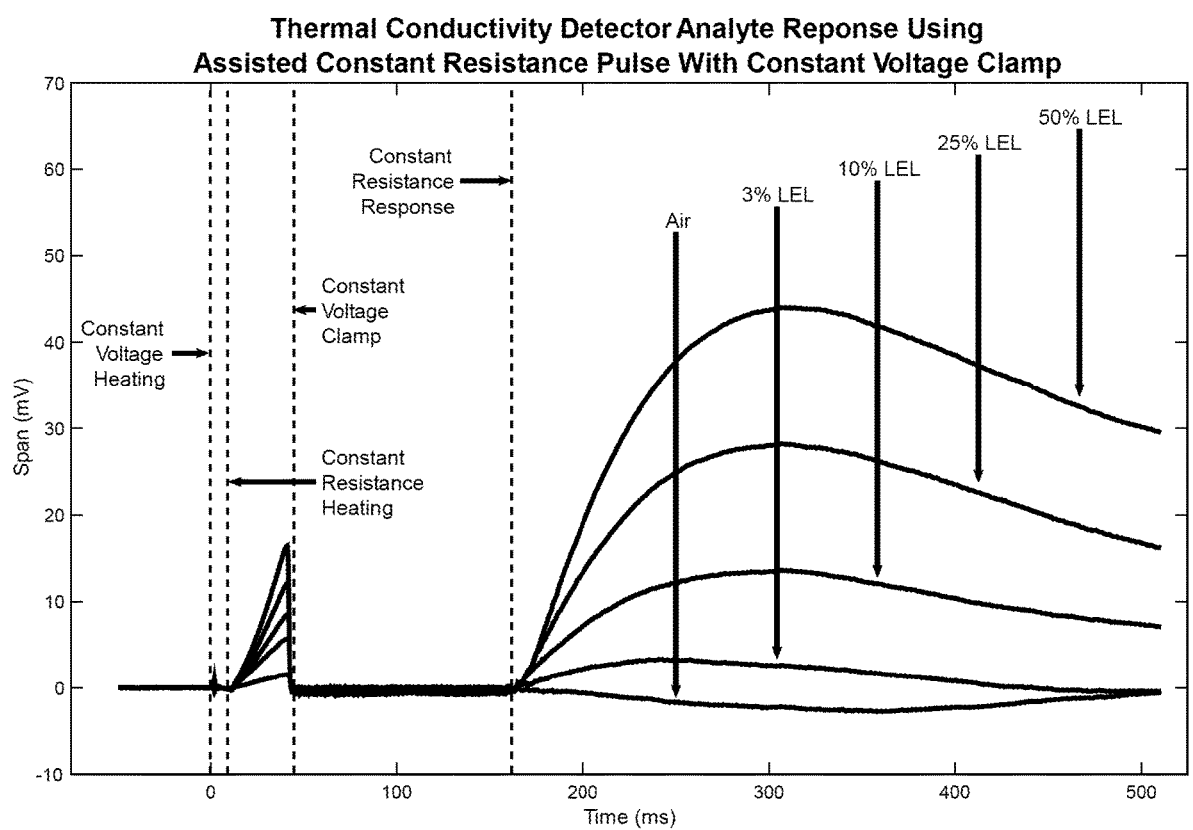
FIG. 17 illustrates the response of a thermal conductive pelement hereof (which includes no catalyst) to a dynamic/pulse input with a constant resistance setpoint in the presence of different concentrations of methane wherein the dynamic/pulse input follows a preliminary bridge unbalancing phase and is resumed after a clamped voltage phase.
Figure 18A:
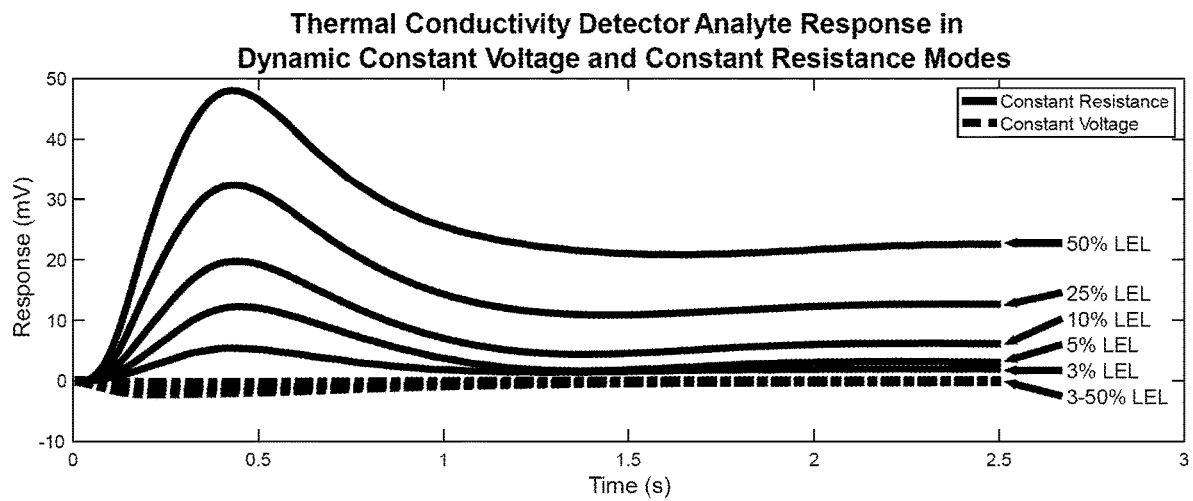
FIG. 18A illustrates a comparison of thermal conductivity sensor response to dynamic/pulse input with a constant voltage setpoint to thermal conductivity sensor response to dynamic/pulse input with a constant resistance setpoint.
Figure 18B:
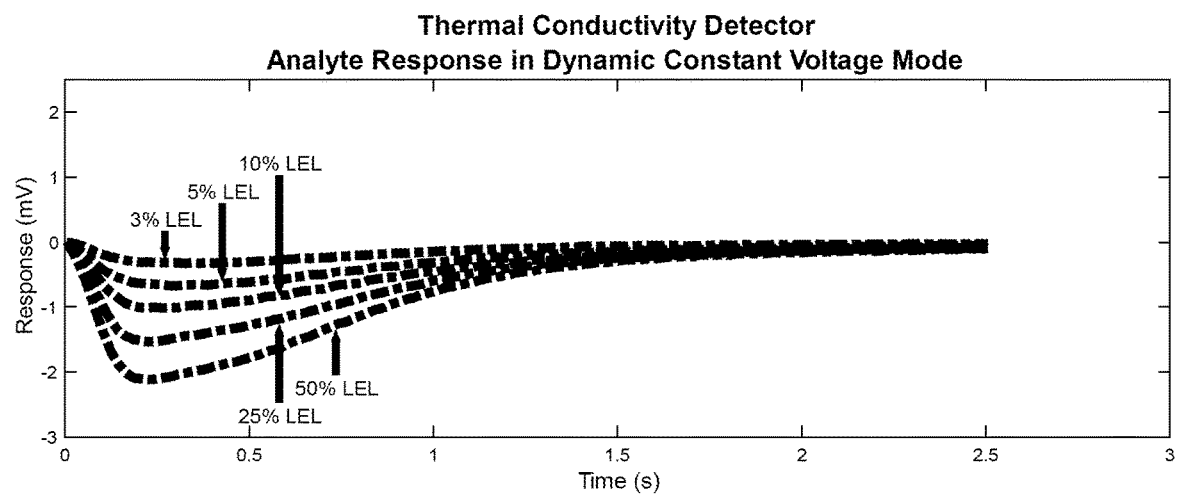
FIG. 18B illustrates the thermal conductivity sensor response to dynamic/pulse input with a constant voltage setpoint of FIG. 18A with an expanded scale.
Figure 18C:
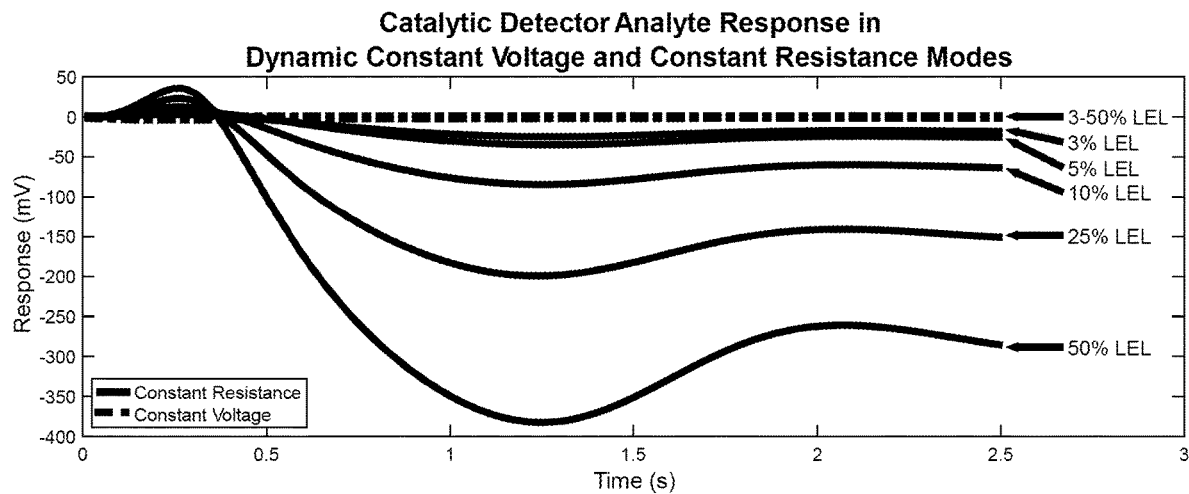
FIG. 18C illustrates a comparison of catalytic combustible gas sensor response to dynamic/pulse input with a constant voltage setpoint to catalytic combustible gas sensor response to dynamic/pulse input with a constant resistance setpoint.
Figure 18D:
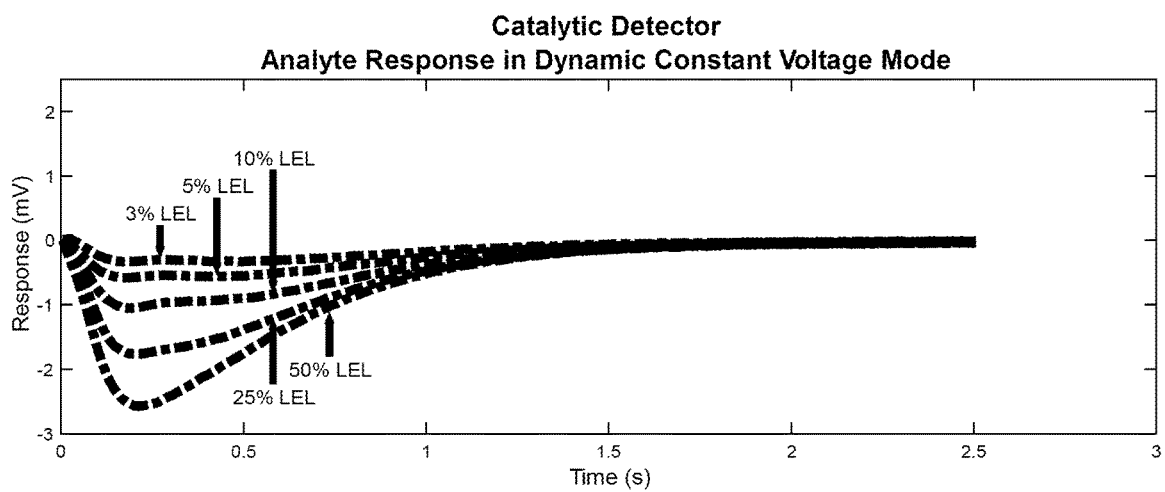
FIG. 18D illustrates the catalytic combustible gas sensor response to dynamic/pulse input with a constant voltage setpoint of FIG. 18C with an expanded scale.

FIGS. 16 and 17 both demonstrate that significant signal is possible from approximately T-175 ms to T-500 ms in a duty cycle that is comparable to that of constant-voltage-setpoint pulsed operation on a MEMS device. The voltage signal provided herein, however is approximately ten times that which is observed in a similar constant-voltage-setpoint application. These results demonstrate the benefit of a constant-resistance-setpoint, dynamic response at a non-optimized power consumption that is approximately 15% greater than that for existing constant-voltage-setpoint procedures using a MEMS device. FIG. 18A illustrates a comparison of dynamic response measured in a constant-resistance-setpoint operating methodology and in a constant-voltage-setpoint operating methodology to various concentrations of analyte for a thermal conductivity sensor hereof. The scale of FIG. 18A makes it difficult to view the response in the constant-voltage-setpoint operating methodology. FIG. 18B sets for the response of the thermal conductivity sensor in the constant-voltage-setpoint operating methodology of FIG. 18A with an expanded scale. FIG. 18C illustrates a comparison of dynamic response measured in a constant-resistance-setpoint operating methodology and in a constant-voltage-setpoint operating methodology to various concentrations of analyte for a catalytic combustible gas sensor hereof. Similar to FIG. 18A, the scale of FIG. 18C makes it difficult to view the response in the constant-voltage-setpoint operating methodology. FIG. 18D sets for the response of the catalytic combustible gas sensor in the constant-voltage-setpoint; operating methodology of FIG. 18C with an expanded scale.

Figure 19:
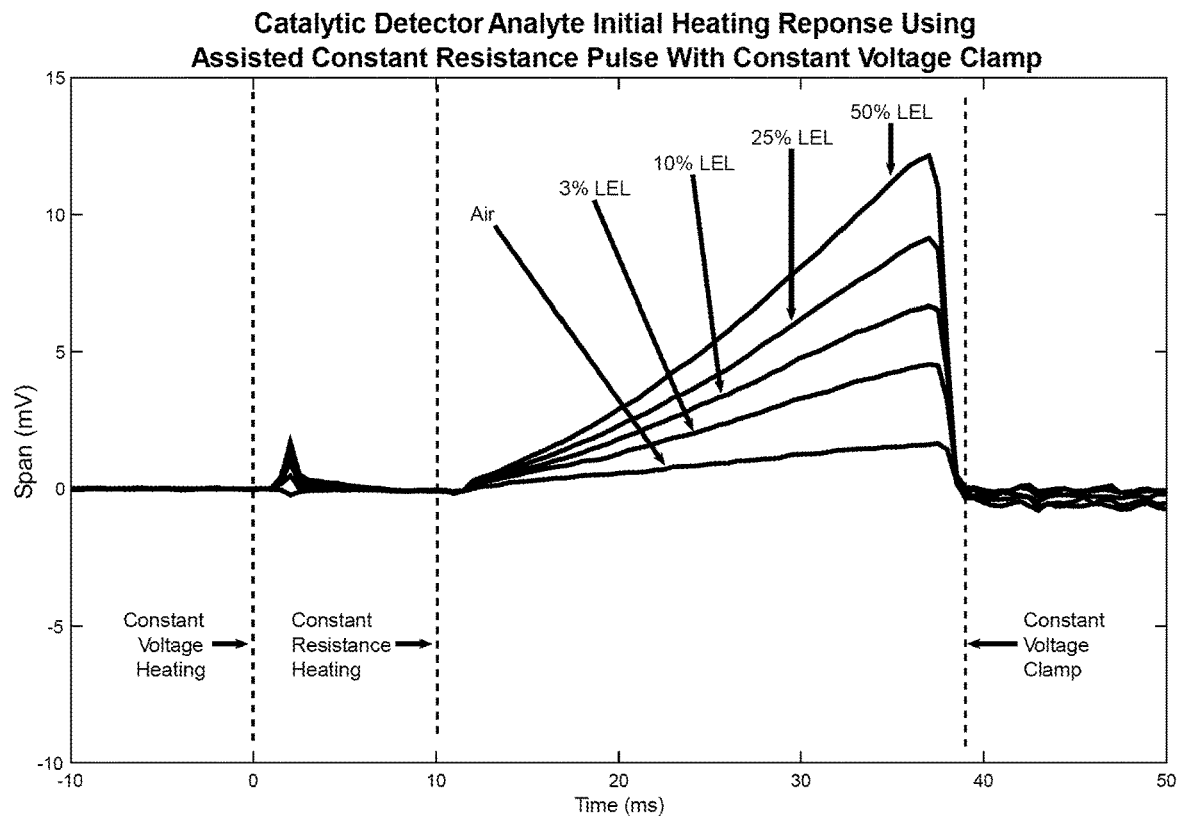
FIG. 19 illustrates a portion of FIG. 16 including the response of a catalytic pelement to the dynamic/pulse input up to the point of the clamped voltage phase (before a pelement temperature is reached at which the catalyst of the pelement catalyzes combustion of methane) having an expanded scale which demonstrates a thermal conductivity response of the catalytic pelement (in the absence of catalytic combustion).
Figure 20:
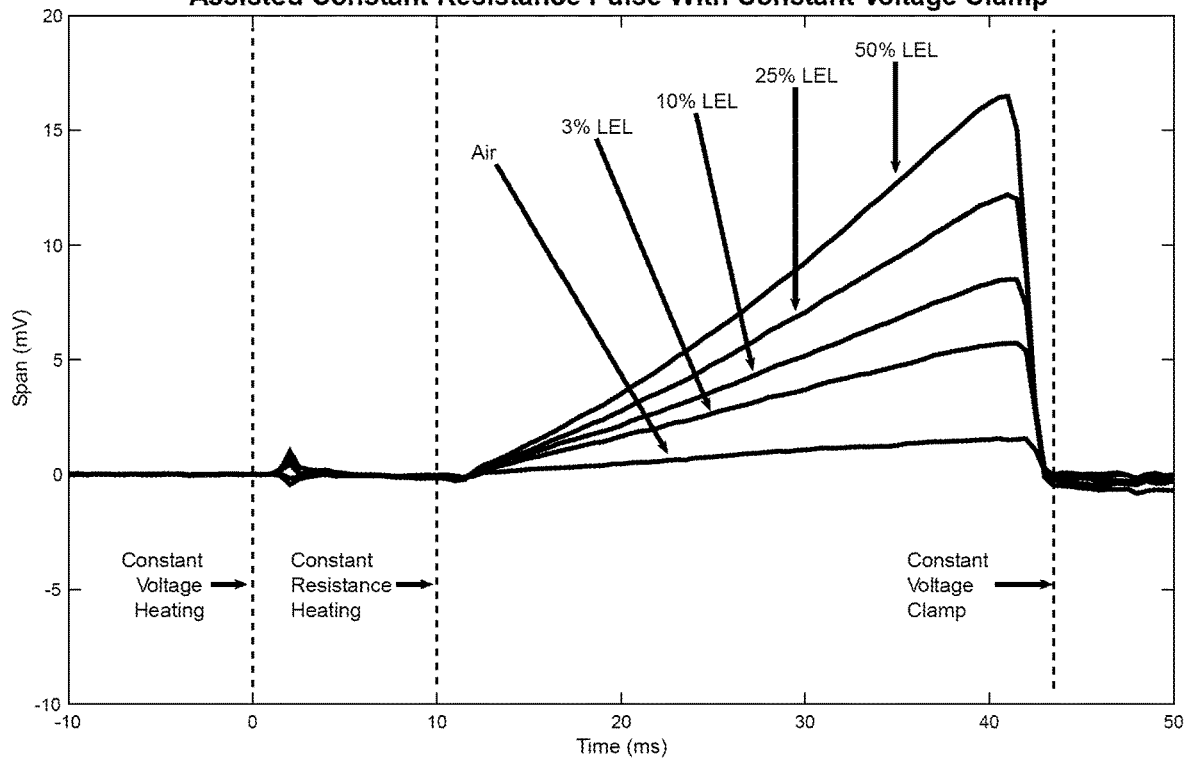
FIG. 20 illustrates a portion of FIG. 17 including the response of a thermal conductivity pelement (including no catalyst) to the dynamic/pulse input up to the point of the clamped voltage phase having an expanded scale which demonstrates a thermal conductivity response.

All of the signal apparent in each FIGS. 16 and 17 occurs at times when the element has not reached thermal equilibrium (reference FIG. 15). Furthermore, both FIGS. 16 and 17 show significant and differentiating signal at T<50 ms. FIGS. 19 and 20 expand FIGS. 16 and 17 to view that time range at an expanded scale. FIGS. 19 and 20 demonstrate that for both the standard pelement and the thermal conductivity pelement there exists significant and differentiating voltage signal at T<50 ms for different concentrations of methane. The signal for both the standard pelement and the thermal conductivity pelement are in the same direction which indicated that at this time scale the standard detector is working in a thermal conductivity mode. Because T<50 ms is before the pelement has been fully heated to the setpoint resistance, $R_{CR}$, the temperature of the pelement is below that which is required to combust the analyte gas. In other words, the detector is working in a thermal conductivity mode in this regime (that is, below the temperature at which the analyte gas or gasses combust). Furthermore, these figures demonstrate that even lower duty cycles may be possible to accurately detect and/or differentiate methane concentrations using a dynamic, constant-resistance-setpoint, response.

Figure 21:
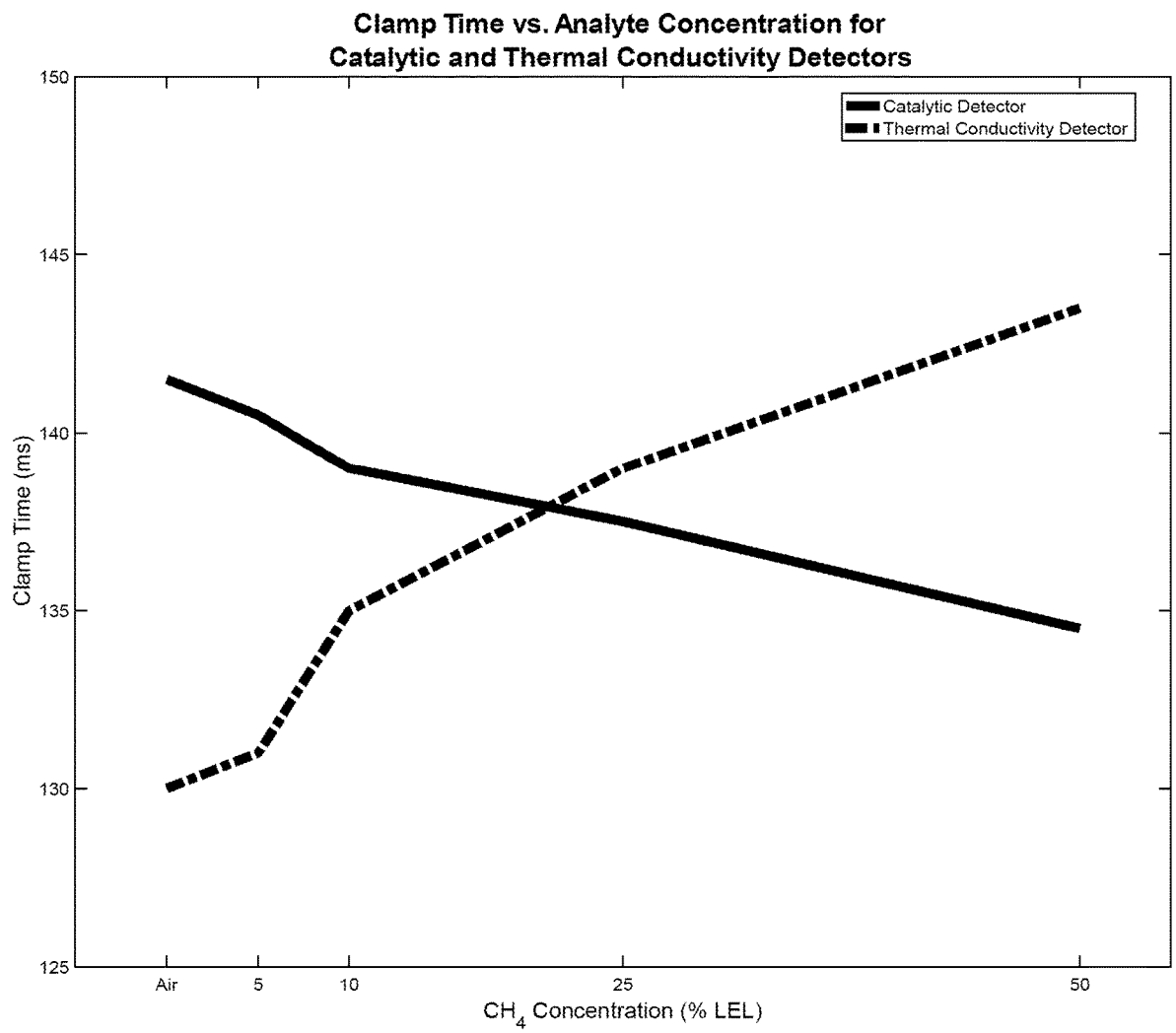
FIG. 21 illustrates a study of clamp time versus analyte concentration for each of a thermal conductivity sensor and a catalytic combustible gas sensor.

Having established the initial heating (T<50 ms) response and the post clamp (T>175 ms) response are each possible methods of detection and/or differentiation of methane concentrations in a dynamic, constant-resistance-setpoint response, a third metric that can be considered is the length of time in which the clamp circuitry is enabled. In higher concentrations of analyte gas the pelement heats at a faster rate. Thus, the length of time the clamp circuitry overrides the error amplifier decreases and a time measurement may be sufficient to approximate the concentration of analyte gas. FIG. 21 illustrates a study of clamp time versus concentration for methane for a thermal conductivity sensor hereof and for a catalytic combustible gas sensor hereof demonstrating the dependency of clamp time upon concentration of analyte in each mode of operation.

The dynamic, constant-resistance-setpoint devices, systems and methods hereof may be used in connection with combustible gas detection trigger element and/or a "primary" combustible gas sensing element used for concentration differentiation to increase signal-to-noise ratio compared to currently available devices, systems and method. In a number of embodiments of combustible gas sensors hereof, the sensor may, for example, include sensing element and compensating element and at least one other element, sometimes referred to as a trigger or a "sniff element" as known in the art. In general, a trigger element is not required to provide a linear response and is not required to be immune to positive excursion temperature/humidity fluctuations. With the restrictions of linearity and immunity to positive temperature and humidity fluctuations eliminated, the size and power restrictions of the trigger element may be reduced in comparison to "detector" elements used for concentration differentiation.

Figure 22:
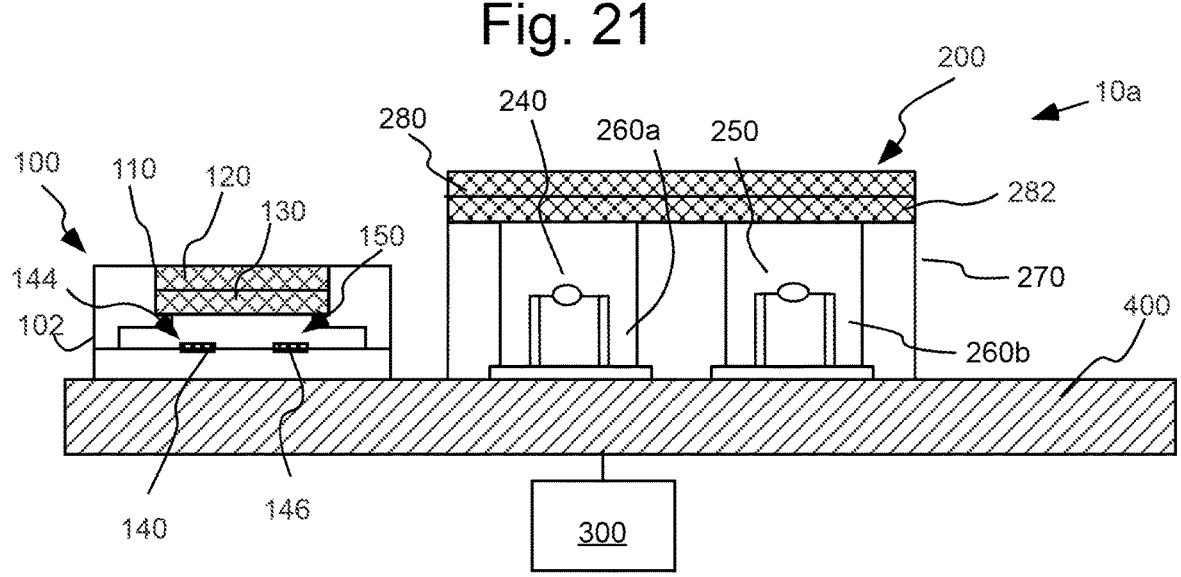
FIG. 22 illustrates schematically a cross-sectional view of a device or system hereof including a primary combustible gas sensor including a sensing element and a compensating element and MEMS trigger combustible gas sensor in which the electrical circuitry hereof is configured to operate at least the trigger combustible gas sensor via a dynamic/pulse input with a constant resistance setpoint.

FIG. 22, for example, illustrates a schematic view of an embodiment of a MEMS or micro-hotplate trigger sensor 100 hereof, which includes a housing 102 having a gas inlet 110. A screen or cap 120, which may include or function as a filter 130, may, for example, be placed in connection with inlet 110. The energy (current and voltage) used in MEMS micro-hotplate trigger sensor 100 may, for example, be sufficiently low to provide intrinsic safety such that a flashback arrestor, as known in the combustible gas detector arts, may not be necessary. As described above, flashback arrestors (for example, porous frits) allow ambient gases to pass into a housing but prevent ignition of combustible/flammable gas in the surrounding environment by hot elements within the housing. One or more heating elements or hotplates 140 and 146 may, for example, be used to heat an oxidative layer 152 (which may, for example, be an oxidative catalyst layer) of a first MEMS element or pellistor 144 to a first operating temperature. In a number of embodiments, a second MEMS element or second pellistor 150 may be included within MEMS hotplate trigger sensor 100 to be heated to a second operating temperature.

In a number of embodiments, first MEMS element 150 may be operated as a sensing or detecting element and second MEMS element 150 may be operated as a compensating element as known in the combustible gas sensor arts. In other embodiments, the operation of MEMS elements 144 and 150 may be switched by altering the mode of operation thereof. In a number of embodiments, the operation of a particular element as a sensing element or a compensating element may be controlled by controlling the operating temperature thereof as, for example, described in U.S. Pat. No. 8,826,721. In that regard, if the operating temperature of an element is maintained at or above a temperature at which gas will combust at the surface thereof, it may be operated as a sensing element. If the operating temperature of an element is maintained below a temperature at which gas will combust at the surface thereof, it may be operated as a compensating element. The temperature at which gas will combust at the surface of an element depends upon the composition of that surface. Surfaces including a catalytic material will typically cause combustion at a temperature (a catalytic light-off temperature) lower than a surface not including a catalytic material.

If operated solely as a MEMS compensator element 150 may, for example, include an inactive layer which may be heated by one or more heating elements or hotplates 146. In this case, the second operating temperature may be maintained at a temperature lower than the temperature required to cause combustion at a surface thereof in the absence of a catalyst. Alternatively an active catalyst may be included on compensator element 150 and compensator element 150 may be operated at a sufficiently low temperature to prevent catalytic oxidation of combustible gas at the surface thereof.

MEMS hotplate sensor 100 may, for example, mounted on a printed circuit board or PCB 400. The two resistances of sensing element 144 and compensating element 150 may, for example, be part of a measuring circuit for circuit 300 (illustrated schematically in FIG. 22; see FIG. 2) including a Wheatstone bridge circuit or a simulated Wheatstone bridge as discussed above. A representative example of a MEMS hotplate sensor suitable for use herein is an SGX MP7217 hotplate sensor or pellistor available, from SGX Sensortech, SA of Corcelles-Coromondreche, Switzerland. Such a MEMS hotplate sensor is disclosed, for example, in U.S. Pat. No. 9,228,967.

A trigger sensor may, for example, be deployed with a primary combustible gas sensor either as a two-sensor system or the trigger sensor may be embedded into a single combustible gas sensor system that, for example, includes a primary combustible gas sensor, which provides a calibrated response which is dependent upon analyte gas concentration. A primary combustible gas sensor 200 as illustrated in FIG. 22 may, for example, be a traditional or conventional catalytic bead system, a lower-thermal-mass pelement system or a low-thermal-mass MEMS system FIG. 22 schematically illustrates an embodiment of a sensor system or device 10a hereof which includes MEMS hotplate combustible gas sensor 100 as a trigger combustible gas sensor and a conventional or low-thermal-mass pelement combustible gas sensor 200 as a primary combustible gas sensor. As illustrated in FIG. 22, MEMS hotplate combustible gas sensor 100 and combustible gas sensor 200 may, for example, be placed in operative connection with circuitry 300 via PCB 400.

Electronic circuitry 300 of sensor system or device 10a may, for example, be in operative connection with each of MEMS micro-hotplate, trigger combustible gas sensor 100 and primary combustible gas sensor 200 to, for example, control power to the sensors (as described above) and to process an output signal from the sensors (as described above). One or more algorithms for control of sensor 100 and sensor 200 and/or for processing of data may, for example, be stored in memory system 320 and executed by processor system 310. Output of sensors 100 and/or 200 may, for example, be provided to a user or users via user interface 330 (for example, including one or more devices for input/output of information including a touch screen display, a speaker etc.) in operative connection with processor system 310. User interface 330 may, for example, be provided as a component of the combustible gas sensor system or device 10a and/or remote from the combustible gas sensor. An alarm signal may, for example, be generated via the electronic circuitry and provided to a user via one or more components of user interface 330 (for example, visually, audibly etc.).

Primary combustible as sensor 200 includes a first element or pelement 240 and second element or pelement 250. As described above, one of the first element 240 and second element 250 is operated as a sensing element, while the other of first element 240 and second element 250 is operated as a compensating element. Once again, the function of an element can, for example, be controlled by the mode of operation/operating temperature thereof. The temperature may be controlled by control of the power provided to the element. The two resistances may, for example, be part of a measurement circuit such as a Wheatstone bridge circuit or a simulated Wheatstone bridge circuity as illustrated in FIG. 2. The characteristics of second pelement 250 may be matched as closely as possible with active or sensing pelement 240. In a number of embodiments in which second element 250 is operated solely as a compensating pelement, second element 250 may, for example, either carry no catalyst or carry an inactivated or poisoned catalyst.

In the illustrated embodiment, first element or pelement 240 and second element or pelement 250 are positioned within wells 260a and 260b of an explosion-proof housing 270 and can be separated from the surrounding environment by a flashback arrestor, for example, a porous metal frit 280. A filter element 282 may also be present.

In operation of system or device 10a in a first mode, MEMS hotplate trigger-sensor 100 is operated to detect a change in the analyte gas or gases entering system or device 10a, while primary combustible gas sensor 200 is maintained in a low power, inactive, or OFF state. If a response signal from MEMS hotplate trigger sensor 100 is determined by circuitry 300 to indicate that the concentration of one or more analyte gases has changed or has changed in an amount above a predetermined threshold, a second mode of operation is initiated and activation of primary combustible gas sensor 200 occurs (that is, a powered, active or ON state of primary combustible gas sensor 200 is activated). Once the primary combustible gas sensor 200 determines that the analyte gas is not present or is present in a concentration below a predetermined threshold, device 10a may be returned to the first mode of operation.

As described above, trigger sensors hereof need not be, but may be "diagnostic" sensors with sufficient characteristics to provide an accurate indication of the concentration of the combustible gas analyte being sensed. Such characteristics would include, for example, sufficient response range to provide accurate indications of gas content over a desired range of concentration, long-term baseline stability, significant resistance to changes arising from environmental conditions, etc. The trigger sensors hereof may be "non-diagnostic" or "pseudo-diagnostic." In that regard, the trigger sensors may have sufficient range and accuracy to be useful to accomplish the trigger function described herein. Stability and accuracy are not as important in this functionality inasmuch as non-conservative false negative deviations are avoided. In a number of embodiments, there is no need to refer to an earlier established calibration event in the case of non-diagnostic trigger sensor hereof. In the case of a non-diagnostic trigger sensor, a compensating element may not be required.

Providing both a first MEMS or other low-thermal-mass element and a second MEMS or other low-thermal-mass element in a trigger sensor hereof requires very little energy for operation. Trigger sensors hereof may provide a relatively accurate output of gas concentration. In that regard, the MEMS or other low-thermal-mass combustible gas trigger sensors hereof provide a compensated gas concentration output or reading that may be posted to a user while the primary combustible sensor (for example, a pelement-based sensor 200) is inactive and/or when activated and warming up sufficiently to take a reading. Moreover, a reading or measurement from a micro-hotplate or other low-thermal-mass trigger sensor hereof may be used to activate an alarm level if needed.

Even in the case in which a trigger sensor hereof include only a single element, use of a MEMS element provides significant reductions in power requirements as compared to currently available trigger beads. Moreover, whether a trigger sensor hereof include one or two elements, significant reductions in power requirements may be achieved by operation in a pulsed mode.

As described above, providing a low-power trigger sensor can reduce required power by allowing very low power (including zero power) operation of a primary, higher-power, analytical sensor until the secondary, trigger sensor detects a change or a threshold change in concentration of a combustible gas. Operating a trigger sensor in a dynamic or pulse mode under a constant-resistance-setpoint, as described herein, provides an intermediate monitoring of the gas mixture of the environment in fluid connection with the sensor device, system or instrument while providing increased signal compared to a constant-voltage-setpoint mode of control.

As also described above, the first primary element 240 and second primary element 250 may be operated in a cyclic mode as, for example, disclosed in U.S. Pat. Nos. 8,826,721 and 9,625,406. In that regard, a sensor may be cycled between a first mode in which first primary element 240 is operated in a higher power mode and second primary element 250 is operated in a lower power mode and a second mode in which second or compensating element is operated in a higher power mode and the first or sensing element is operated in a lower power mode. In that regard, the electronic circuitry of the system hereof may, for example, be adapted to or configured to cycle between a first mode in which the first primary element is operated in a higher power (high temperature) mode and the second sensing element is operated in a lower power (lower temperature) mode and a second mode in which the second sensing element is operated in a higher power (higher temperature) mode and the first sensing element is operated in a lower power (lower temperature) mode. In the first mode, the second sensing element can, for example, be used to compensate for ambient temperature changes. In the second mode, the first sensing element can, for example, be used to compensate for ambient temperature changes. The electronic circuitry can, for example, be adapted to periodically switch between the first mode and the second mode. The electronic circuitry can, for example, be adapted to switch between the first mode and the second mode upon a manually controlled event. The manually controlled event can, for example, include a power on event.

Figure 23:
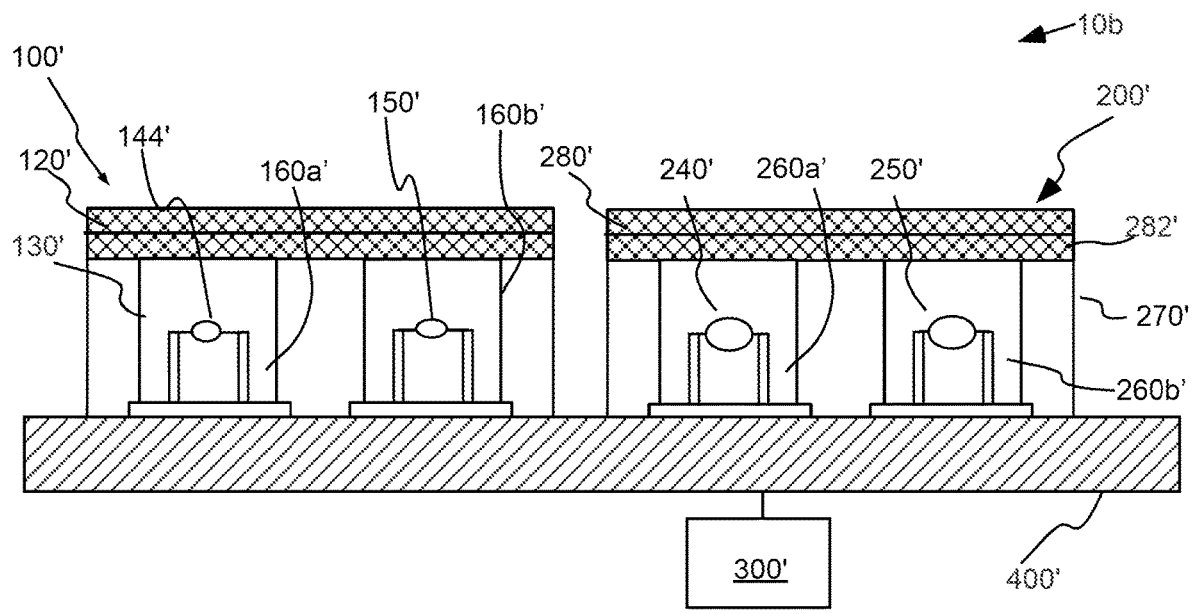
FIG. 23 illustrates schematically a cross-sectional view of a device or system hereof including a primary combustible gas sensor including a sensing element and a compensating element and a low-thermal-mass sensor operated as a trigger sensor in which the electrical circuitry hereof is configured to operate at least the trigger sensor via a dynamic/pulse input with a constant resistance setpoint.

FIG. 23 illustrates another embodiment of a system 10B which is similar in operation to system 10A. However, in the embodiment of FIG. 23, trigger sensor 100' includes a first low-thermal-mass pelement 144' and a second low-thermal-mass pelement 150'.

In the case of the embodiments of FIGS. 22 and 23, the elements of the trigger sensor may, for example, include no catalyst and be operated in a thermal conductivity mode as described herein. In the case that such element include a catalyst, one can operated the trigger sensor in a thermal conductivity mode and/or a combustible gas sensor mode.

Figure 24:
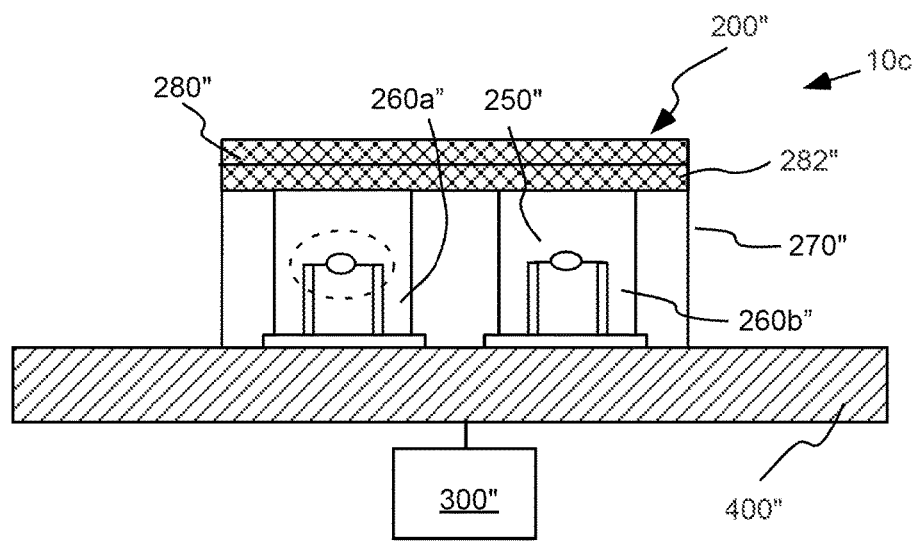
FIG. 24 illustrates a cross sectional view of a device or system hereof including a low-thermal-mass sensor operated as a trigger sensor via a dynamic/pulse input (for example, with a constant resistance setpoint) at a first duty cycle and operated as a primary sensor at a second, higher duty cycle upon measuring a threshold response when operated as a trigger sensor.

FIG. 24 illustrates another embodiment of a system 10c hereof which includes a sensor 200" including a first low-thermal-mass element (for example, a low-thermal-mass pelement or a MEMS element) 260a" and a second low-thermal-mass element (for example, a lower-thermal-mass pelement or a MEMS element) 260b" which may be operated as a compensating element as described herein. First low-thermal-mass element 260a" may include a catalyst. In a first mode of operation, sensor 200" is operated in a pulsed or dynamic trigger mode (with either a constant voltage setpoint or a constant resistance setpoint) at a first duty cycle. In a number of embodiments, sensor 200" is operated in a dynamic or pulsed mode with a constant resistance setpoint. Upon measurement of a threshold response in the trigger mode, sensor 200" is switched to a primary mode at a second duty cycle which is greater than the first duty cycle. The second duty cycle may, for example, be 100%. In a number of embodiments first and second low-thermal-mass elements 260a" and 260b" are low-thermal-mass pelements.

Dynamic, constant-resistance-setpoint methodologies set forth herein are feasible for use with different types of pelements and MEMS devices. Inclusion of a heating phase (for example, at constant voltage) before enabling constant-resistance-setpoint control significantly improved the response time of the sensors hereof, but the natural response of a constant-resistance-setpoint topology significantly increases voltage on the element while trying to heat the element to the desired setpoint resistance. This voltage can reach levels that are incompatible with certain integrating devices on, for example, a battery powered gas detection instrument. A voltage monitoring circuit was, therefore, included to mitigate the risk of a brown-out condition. The response with both an initial, constant-voltage heating phase and a clamp-circuitry-enabled phase exhibited signal that is, for example, sufficient for detection trigger and/or concentration differentiation of an combustible gas analyte (for example, methane) at a duty cycle that is feasible for low-power operation when the element may or may not have been on (powered) for sufficient time to reach thermal equilibrium. The results also indicate that there are still further opportunities to reduce the duty cycle for these elements and, therefore, further decrease power consumption.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A gas sensor device for detecting an analyte gas, comprising: a sensing element comprising a heating element and electronic circuitry in operative connection with the heating element, the sensing element forming a resistive element in a circuit of the electronic circuitry, the electronic circuitry being configured to operate the sensing element in a trigger mode via a pulsed energy input to the heating element at a first duty cycle via and in a primary mode via a pulsed energy input to the heating element at a second duty cycle, wherein the second duty cycle is greater than the first duty cycle, the electronic circuitry further being configured to measure a response of the sensing element over time during each pulse of a plurality of pulses of the pulsed energy input, and wherein the primary mode is entered upon measurement of a value of a response at or above a threshold value in the trigger mode.

2. The gas sensor device of claim 1 wherein a constant resistance setpoint is set for the sensing element and energy through the circuit is variably controlled via the electronic circuitry during each pulse of the plurality of pulses toward achieving the constant resistance setpoint in at least one of the trigger mode and the primary mode.

3. The gas sensor device of claim 1 wherein a constant voltage setpoint is set for the sensing element and energy through the circuit is variably controlled via the electronic circuitry during each pulse of the plurality of pulses toward achieving the constant voltage setpoint in at least one of the trigger mode and the primary mode.

4. The gas sensor device of claim 1 wherein the gas sensor device is a combustible gas sensor and the sensing element is a low-thermal-mass element.

5. The gas sensor device of claim 4 wherein the sensing element comprises a catalyst and, upon measurement a value of a response at or above the threshold value, the sensing element is operated in primary mode at the second duty cycle.

6. The gas sensor device of claim 4 wherein the sensing element has a thermal time constant of 8 seconds or less.

7. The gas sensor device of claim 1 wherein, in at least one of the trigger mode and the primary mode, the electronic circuitry is configured to operate in a mode in which the analyte gas is detected via a change in thermal conductivity from the response of the sensing element over time during the pulsed energy input in a lower temperature range and in a mode in which the analyte gas is detected via a combustion reaction of the analyte gas from the response of the sensing element over time during the pulsed energy input in a higher temperature range.

8. The gas sensor device of claim 1 wherein the sensing element comprises a catalyst supported thereon for catalytic combustion of the analyte gas.

9. A method of operating a gas sensor device to detect an analyte gas including a sensing element, which includes a heating element, and electronic circuitry in operative connection with the heating element, the sensing element forming a resistive element in the electronic circuitry, comprising: controlling the electronic circuitry to operate the sensing element in a trigger mode via a pulsed energy input to the heating element at a first duty cycle, measuring a response of the sensing element over time during each pulse of a plurality of pulses of the pulsed energy input in the trigger mode, and, upon measurement a value of a response at or above a threshold value in the trigger mode, entering a primary mode via energy input to the heating element in a pulsed manner at a second duty cycle, wherein the second duty cycle is greater than the first duty cycle.

10. The method of claim 9 wherein a constant resistance setpoint is set for the sensing element and energy through the circuit is variably controlled via the electronic circuitry during each pulse of the plurality of pulses toward achieving the constant resistance setpoint in at least one of the trigger mode and the primary mode.

11. The method of claim 9 wherein a constant voltage setpoint is set for the sensing element and energy through the circuit is variably controlled via the electronic circuitry during each pulse of the plurality of pulses toward achieving the constant voltage setpoint in at least one of the trigger mode and the primary mode.

12. The method of claim 9 wherein the gas sensor is a combustible gas sensor and the sensing element is a low-thermal-mass element.

13. The method of claim 12 wherein the sensing element comprises a catalyst and, upon measurement a value of a response at or above the threshold value, the sensing element is operated in primary mode at the second duty cycle.

14. The method of claim 12 wherein the sensing element has a thermal time constant of 8 seconds or less.

15. The method of claim 9 wherein, in at least one of the trigger mode and the primary mode, the electronic circuitry is configured to operate in a mode in which the analyte gas is detected via a change in thermal conductivity from the response of the sensing element over time during the pulsed energy input in a lower temperature range and in a mode in which the analyte gas is detected via a combustion reaction of the analyte gas from the response of the sensing element over time during the pulsed energy input in a higher temperature range.

16. The method of claim 9 wherein the sensing element comprises a catalyst supported thereon for catalytic combustion of the analyte gas.

17. A gas sensor device, comprising: a sensing element comprising a heating element in operative connection with an electronic circuitry, the sensing element forming a resistive element in a circuit of the electronic circuitry, the electronic circuitry being configured to heat the sensing element to a temperature at which the sensing element is responsive to an analyte gas via a pulse of energy which is input to the heating element, the electronic circuitry being configured to operate in a mode in which the analyte gas is detected via a change in thermal conductivity from the response of the sensing element over time during the pulse of energy in a lower temperature range and in a mode in which the analyte gas is detected via a combustion reaction of the analyte gas from the response of the sensing element over time during the pulse of energy in a higher temperature range.

18. The gas sensor device of claim 17 wherein a constant resistance setpoint is set for the sensing element and energy through the circuit is variably controlled via the electronic circuitry during the pulse of energy toward achieving a constant resistance setpoint.

19. The gas sensor device of claim 17 wherein a constant voltage setpoint is set for the sensing element and energy through the circuit is variably controlled via the electronic circuitry during the pulse of energy toward achieving the constant voltage setpoint in at least the trigger mode of operation.

20. The gas sensor device of claim 17 wherein a plurality of the pulses of energy are input to the heating element over time.

\* \* \* \* \*

UNITED STATES PATENT AND TRADEMARK OFFICE
CERTIFICATE OF CORRECTION

| | |
|---|---|
| PATENT NO. | : 12,061,161 B2 |
| APPLICATION NO. | : 18/205207 |
| DATED | : August 13, 2024 |
| INVENTOR(S) | : Daniel D. Santoro, Jr. et al. |

It is certified that error appears in the above-identified patent and that said Letters Patent is hereby corrected as shown below:

In the Claims

Column 27, Claim 1, Line 30, delete "cycle via and in a primary mode" and insert --cycle and in a primary mode--.

Signed and Sealed this
Fifteenth Day of October, 2024

Katherine Kelly Vidal
*Director of the United States Patent and Trademark Office*